(12) United States Patent
Saito et al.

(10) Patent No.: US 10,113,069 B2
(45) Date of Patent: Oct. 30, 2018

(54) COATED ARTICLE

(71) Applicant: ASAHI GLASS COMPANY, LIMITED, Chiyoda-ku (JP)

(72) Inventors: Shun Saito, Chiyoda-ku (JP); Masataka Aikawa, Chiyoda-ku (JP)

(73) Assignee: AGC INC., Chiyoda-ku (JP)

( * ) Notice: Subject to any disclaimer, the term of this patent is extended or adjusted under 35 U.S.C. 154(b) by 183 days.

(21) Appl. No.: 15/153,167

(22) Filed: May 12, 2016

(65) Prior Publication Data

US 2016/0257820 A1 Sep. 8, 2016

Related U.S. Application Data

(63) Continuation of application No. PCT/JP2014/084329, filed on Dec. 25, 2014.

(30) Foreign Application Priority Data

Dec. 27, 2013 (JP) .................... 2013-272662

(51) Int. Cl.

| | | |
|---|---|---|
| *C09D 5/03* | (2006.01) | |
| *C09D 127/14* | (2006.01) | |
| *C09D 167/02* | (2006.01) | |
| *C09D 129/10* | (2006.01) | |
| *B32B 5/16* | (2006.01) | |
| *C09D 167/00* | (2006.01) | |
| *C09D 7/40* | (2018.01) | |
| *B05D 7/24* | (2006.01) | |
| *C09D 7/12* | (2006.01) | |
| *C09D 127/12* | (2006.01) | |
| *B05D 5/08* | (2006.01) | |

(52) U.S. Cl.
CPC ............... *C09D 5/036* (2013.01); *B32B 5/16* (2013.01); *C09D 127/14* (2013.01); *C09D 129/10* (2013.01); *C09D 167/00* (2013.01); *C09D 167/02* (2013.01); *B05D 5/083* (2013.01); *B05D 7/24* (2013.01); *B05D 2401/32* (2013.01); *B05D 2601/24* (2013.01); *B32B 2264/0242* (2013.01); *B32B 2264/0278* (2013.01); *B32B 2264/102* (2013.01); *B32B 2307/712* (2013.01); *C09D 5/03* (2013.01); *C09D 7/12* (2013.01); *C09D 7/40* (2018.01); *C09D 127/12* (2013.01)

(58) Field of Classification Search
CPC combination set(s) only.
See application file for complete search history.

(56) References Cited

U.S. PATENT DOCUMENTS

| 4,740,580 A * | 4/1988 | Merck ................ C08G 63/183 525/438 |
|---|---|---|
| 5,321,063 A * | 6/1994 | Shimada .............. C09D 5/032 524/37 |
| 2010/0221578 A1* | 9/2010 | Nishio .................. B32B 27/18 428/702 |
| 2013/0192674 A1* | 8/2013 | Takanashi ............... B32B 7/10 136/259 |
| 2013/0196062 A1* | 8/2013 | Wang ..................... C09D 5/03 427/201 |

FOREIGN PATENT DOCUMENTS

| CN | 103194140 A | 7/2013 | |
|---|---|---|---|
| JP | 2008-266361 | 11/2008 | |
| JP | 2011-11117 | 1/2011 | |
| JP | 2011-12119 | 1/2011 | |
| WO | WO-2013006616 A1 * | 1/2013 | ............ C08K 5/005 |
| WO | WO 2013/186832 A1 | 12/2013 | |
| WO | WO 2014/002964 A1 | 1/2014 | |
| WO | WO 2015/016185 A1 | 2/2015 | |

OTHER PUBLICATIONS

Machine translation of CN 103194140 A, dated Jan. 2018. (Year: 2018).*
International Search Report dated Mar. 24, 2015 in PCT/JP2014/084329 filed on Dec. 25, 2014.

* cited by examiner

*Primary Examiner* — Nicole M Buie-Hatcher
(74) *Attorney, Agent, or Firm* — Oblon, McClelland, Maier & Neustadt, L.L.P.

(57) ABSTRACT

To provide a coated article, in which formation of a cured film having a fluororesin layer and a polyester layer is not cumbersome, and the cured film is excellent in weather resistance. A coated article having a cured film formed by coating a substrate with a powder coating material comprising a fluorinated polymer (A), a polyester polymer (B), an ultraviolet absorber (C) and titanium oxide (E), wherein the thickness of the cured film is from 20 to 1,000 μm, the atom number concentration of Ti element present in a region (I) within 5 μm in depth from the surface of the cured film is from 0 to 9%, the atom number concentration of Ti element present in a region (II) beyond 10 μm in depth from the surface of the cured film is from 8.5 to 10%, and the proportion of the ultraviolet absorber (D) contained in the region (I) (100 mass %) is from 0.5 to 10 mass %.

17 Claims, No Drawings

COATED ARTICLE

TECHNICAL FIELD

The present invention relates to a coated article having a cured film on the surface of a substrate.

BACKGROUND ART

In recent years, global scale environmental destruction problems such as global warming, ozone layer depletion, acid rain, etc. have gained prominent attention. Internationally, environmental pollution measures are advocated, and various regulations have been established from the viewpoint of environmental protection. Among them, release into the atmosphere of organic solvents (VOC) has been a serious problem, and also in each industry, the movement for de-organic solvents (de-VOC) along with the trend for strengthening VOC regulations has become active. Also in the paint industry, as a substitute for conventional organic solvent-based coating material, a powder coating material is highly expected as a coating material which contains no VOC and which is friendly to the environment as it can be recovered and reused without requiring exhaust treatment or wastewater treatment.

As such a powder coating material, an acrylic resin powder coating material, a polyester resin powder coating material or an epoxy resin powder coating material, is mainly used. However, cured films formed by using these powder coating materials have such a drawback that they are poor in weather resistance.

As a powder coating material to overcome such a drawback, a fluororesin type powder coating material using a fluororesin has been developed (see e.g. Patent Document 1).

Further, for the purpose of e.g. cost reduction, a powder coating material having a polyester resin and a fluororesin blended, has been proposed (see e.g. Patent Document 2).

The powder coating material having a polyester resin and a fluororesin blended, is excellent in weather resistance of the cured film, as compared with an acrylic resin-type powder coating material, a polyester resin-type powder coating material and an epoxy resin-type powder coating material. However, when the cured film contains titanium oxide as a pigment, the weather resistance of the cured film may become insufficient.

Further, it is possible to form a cured film excellent in weather resistance with low cost by carrying out so called two-coatings which comprise coating the surface of a substrate with a polyester resin-type powder coating material to form a polyester layer and coating the surface of the polyester layer with a fluororesin-type powder coating material. However, in such two coatings, it becomes cumbersome to form the cured film.

PRIOR ART DOCUMENTS

Patent Documents

Patent Document 1: JP-A-2008-266361
Patent Document 2: JP-A-2011-12119

DISCLOSURE OF INVENTION

Technical Problem

An object of the present invention is to provide a coated article, in which it is not cumbersome to form a cured film, and the cured film is excellent in weather resistance despite it contains titanium oxide.

Solution to Problem

The present invention provides a coated article having the following constructions [1] to [15].
[1] A coated article which is formed by coating a substrate with a powder coating material comprising a fluorinated polymer (A), a polyester polymer (B), an ultraviolet absorber (D) and titanium oxide (E) and which has a cured film of the above powder coating material, wherein
the thickness of the cured film is from 20 to 1,000 μm,
when the total of the respective atom number concentrations of C element, O element, F element and Ti element present in a region (I) within 5 μm in depth from the surface of the cured film as obtained by the following method (1) is set to be 100%, the atom number concentration of Ti element is from 0 to 9%,
when the total of the respective atom number concentrations of C element, O element, F element and Ti element present in a region (II) beyond 10 μm in depth from the surface of the cured film as obtained by the following method (2) is set to be 100%, the atom number concentration of Ti element is from 8.5 to 15%, and
the proportion of the ultraviolet absorber (D) contained in the above region (I) (100 mass %) as obtained by the following method (3) is from 0.5 to 10 mass %:
Method (1):
By observing a cross section of the cured film by a scanning electron microscope equipped with an energy dispersive X-ray analyzer, the respective atom number concentrations of C element, O element, F element and Ti element present in the region (I) are analyzed by the energy dispersive X-ray analyzer, to determine the atom number concentration of Ti element, when the total of the respective atom number concentrations of C element, O element, F element and Ti element is set to be 100%,
Method (2):
By observing a cross section of the cured film by a scanning electron microscope equipped with an energy dispersive X-ray analyzer, with respect to the following region (II-1) in a case where the thickness of the cured film is at least 20 μm and less than 30 μm, the following regions (II-1) to (II-2) in a case where the thickness of the cured film is at least 30 μm and less than 40 μm, the following regions (II-1) to (II-3) in a case where the thickness of the cured film is at least 40 μm and less than 50 μm, the following regions (II-1) to (II-4) in a case where the thickness of the cured film is at least 50 μm and less than 60 μm, the following regions (II-1) to (II-5) in a case where the thickness of the cured film is at least 60 μm, the respective atom number concentrations of C element, O element, F element and Ti element present in the respective regions are analyzed by the energy dispersive X-ray analyzer, to determine the atom number concentration of Ti element, when the total of the respective atom number concentrations of C element, O element, F element and Ti element is set to be 100%, in each region, whereupon the atom number concentrations of Ti element in the respective regions are summed up and divided by the number of regions to obtain an average value, Region (II-1): a region beyond 10 μm and at most 20 μm in depth from the surface of the cured film, Region (II-2): a region beyond 20 μm and at most 30 μm in depth from the surface of the cured film, Region (II-3): a region beyond 30 μm and at most 40 μm in depth from the surface of the cured film, Region (II-4): a region beyond 40 μm and at most 50 μm in depth from the surface of the cured film, Region (II-5): a region beyond 50 μm and at most 60 μm in depth from the surface of the cured film, Method (3):

By scraping off the region (I) with a cutter, the obtained powder is subjected to high performance liquid chromatography analysis, whereby the amount of the ultraviolet absorber (D) per unit mass in the above powder is obtained from a peak derived from the ultraviolet absorber (D) by using a calibration curve prepared beforehand.

[2] The coated article according to [1], wherein the coating is one-coating.

[3] The coated article according to [1] or [2], wherein the thickness of the cured film is from 20 to 300 μm.

[4] The coated article according to any one of [1] to [3], wherein the powder coating material further contains a curing agent (C).

[5] The coated article according to any one of [1] to [4], wherein the fluorinated polymer (A) is at least one member selected from the group consisting of a hydroxy group-containing fluorinated polymer (A1), a carboxy group-containing fluorinated polymer (A2) and a polyvinylidene fluoride.

[6] The coated article according to any one of [1] to [5], wherein the polyester polymer (B) is a polyester polymer having units derived from a $C_{8-15}$ aromatic polycarboxylic acid compound and units derived from a $C_{2-10}$ polyhydric alcohol compound.

[7] The coated article according to any one of [1] to [6], wherein the ultraviolet absorber (D) is an organic ultraviolet absorber.

[8] The coated article according to any one of [1] to [7], wherein the content ratio ((A)/(B)) of the fluorinated polymer (A) to the polyester polymer (B) in the powder coating material is from 90/10 to 10/90 by mass ratio.

[9] The coated article according to any one of [1] to [8], wherein the content of the ultraviolet absorber (D) in the powder coating material, is from 0.1 to 20 parts by mass, to 100 parts by mass of the fluorinated polymer (A).

[10] The coated article according to any one of [1] to [9], wherein the content of titanium oxide (E) in the powder coating material, is from 20 to 200 parts by mass, to 100 parts by mass of the polyester polymer (B).

[11] The coated article according to any one of [1] to [10], wherein the powder coating material is a powder coating material (I) containing a powder (X) made of a composition (α) comprising a fluorinated polymer (A), a polyester polymer (B), an ultraviolet absorber (D) and titanium oxide (E).

[12] The coated article according to [11], wherein the composition (α) contains a curing agent (C).

[13] The coated article according to any one of [1] to [10], wherein the powder coating material is a powder coating material (II) which comprises a powder (Y) made of a composition (β) containing a fluorinated polymer (A), and a powder (Z) made of a composition (γ) containing a polyester polymer (B) and not containing a fluorinated polymer (A), wherein either one or both of the composition (β) and the composition (γ) contain an ultraviolet absorber (D), and either one or both of the composition (β) and the composition (γ) contain titanium oxide (E).

[14] The coated article according to [13], wherein either one or both of the composition (β) and the composition (γ) contain a curing agent (C).

[15] The coated article according to any one of [1] to [14], wherein the ratio ((A)/(B)) of the cured product of fluorinated polymer (A) as calculated as the fluorinated polymer (A) to the cured product of polyester polymer (B) as calculated as the polyester polymer (B), contained in the entire cured film, is from 90/10 to 10/90 by mass ratio.

Advantageous Effects of Invention

In the coated article of the present invention, it is not cumbersome to form a cured film, and the cured film is excellent in weather resistance despite the cured film contains titanium oxide.

DESCRIPTION OF EMBODIMENTS

The following definitions of terms apply throughout this specification including claims.

A "fluorinated polymer" means a polymer compound having fluorine atoms in the molecule.

A "main component" means that the proportion of that component is at least 50 mass %.

A "glass transition temperature" means an intermediate point glass transition temperature measured by a differential scanning calorimetry (DSC) method.

The "dry blending" means mixing at least two types of powders without melting the powders and without addition of a solvent.

A "coating film" is meant for a film made from a melt of a powder coating material formed by coating with the powder coating material.

A "cured film" is meant for a film formed by curing or solidifying the coating film.

The "one-coating" is meant for coating only once.

By "a powder coating material is melted and cured", it is meant that a powder coating material is made in a molten state to let reactive components therein be reacted and cured.

A "(meth) acrylate" is a generic term for an acrylate and a methacrylate. Individually, it refers to an acrylate or a methacrylate.

A "unit" means a moiety derived from a monomer, which is present in a polymer to constitute the polymer. A unit derived from a monomer having a carbon-carbon unsaturated double bond and formed by addition polymerization of the monomer, is a divalent unit formed by cleavage of the unsaturated double bond. A unit derived from a polyvalent carboxylic acid compound and constituting a polyester resin, is a monovalent or higher valent unit formed by removing a hydroxy group from at least one carboxy group in the polyvalent carboxylic acid compound, and a unit derived from a polyhydric alcohol compound is a monovalent or higher valent unit formed by removing a hydrogen atom from at least one hydroxy group in the polyhydric alcohol compound. Further, one having a structure of a certain unit chemically converted after formation of a polymer, may also be called a unit.

Hereinafter, as the case requires, units derived from an individual monomer may be called by a name having "units" attached to the monomer name.

[Coated Article]

A coated article of the present invention has a cured film formed by coating a substrate with a powder coating material which comprises a fluorinated polymer (A), a polyester polymer (B), an ultraviolet absorber (D) and titanium oxide (E) and which may contain, as the case requires, a curing agent (C), a curing catalyst (F), a light stabilizer (G) and components other than the above (hereinafter referred to as other components (H)).

(Substrate)

The material for the substrate is preferably a metal such as aluminum, iron or magnesium, and aluminum is particularly preferred from such a viewpoint that it is excellent in corrosion resistance and light in weight and has an excellent performance in its application as building material.

The shape, size, etc. of the substrate, are not particularly limited.

(Cured Film)

The cured film is one formed by coating the substrate with the powder coating material, and is usually a layer-separated coating film comprising a fluororesin layer composed mainly of a cured product of the fluorinated polymer (A) and a polyester layer composed mainly of a cured product of the polyester polymer (B), formed on the substrate side than said fluororesin layer.

In some cases, the fluorinated polymer (A) may be a non-curable heat-meltable fluorinated polymer. In such cases, the fluorinated polymer in the powder coating material is melted at the time of coating and then solidified by cooling to form a fluororesin layer. The cured film in the present invention is also meant for a coating film containing such a fluorinated polymer as once melted and then solidified.

Likewise, in some cases, the polyester polymer (B) may be a non-curable heat-meltable polyester polymer. In such cases, the polyester polymer in the powder coating material is melted at the time of coating and then solidified by cooling to form a polyester layer. The cured film in the present invention is also meant for a coating film containing such a polyester polymer as once melted and then solidified.

In the present invention, the fluororesin layer in the cured film is preferably made of a cured product of a reaction curable fluorinated polymer, and the polyester layer is preferably made of a cured product of a reaction curable polyester polymer. The reaction curable fluorinated polymer and the reaction curable polyester polymer are, respectively, preferably polymers which are curable as reacted with a curing agent (C). A polymer which is curable as reacted with a curing agent (C) is preferably a polymer having a reactive group capable of reacting with the curing agent (C). A polymer not having such a reactive group is a heat-meltable polymer as mentioned above, and is once melted and then solidified to form a cured film.

Here, in a powder coating material which does not contain a curing agent (C), even a polymer having a reactive group is a heat-meltable polymer, and is once melted and then solidified to form a cured film. However, in a powder coating material which contains a curing agent (C), it is less likely that only one of the reaction curable fluorinated polymer and the reaction curable polyester polymer is reacted and cured with the curing agent (C), while the other is melted and solidified without being reacted with the curing agent (C), to form a cured film. For example, in the powder coating material (II) as described later, even in a case where only one of powder (Y) and powder (Z) contains a curing agent (C), the curing agent (C) is considered to readily move from one to the other, of the melt of powder (Y) and the melt of powder (Z) at the time of melting of the powder coating material (II), and accordingly, in the cured film to be formed, a cured product of the fluorinated polymer (A) and a cured product of the polyester polymer (B) are considered to be formed. Therefore, when the powder coating material of the present invention contains a curing agent (C), if a polymer having no reactive group is contained, a melt solidified product of such a polymer having no reactive group will be contained in the cured film.

The powder coating material of the present invention is preferably such that the fluorinated polymer (A) is a reaction curable fluorinated polymer, and the polyester polymer (B) is a reaction curable polyester polymer. Further, the powder coating material of the present invention preferably contains a curing agent (C). In some cases, the fluorinated polymer (A) may be a fluorinated polymer which is not reaction curable. Hereinafter, unless otherwise specified, the fluororesin layer in the cured film is made of a cured product of the fluorinated polymer (A), and the polyester layer in the cured film is made of a cured product of the polyester polymer. Further, unless otherwise specified, the fluorinated polymer (A) is made from a reaction curable fluorinated polymer, and the polyester polymer (B) is made of a reaction curable polyester polymer.

The cured film may have another layer between the substrate and the polyester layer, between the polyester layer and the fluororesin layer, or on the surface of the fluororesin layer, but a double-layered structure composed of the fluororesin layer and the polyester layer, is preferred, since formation of a cured film is thereby not complicated.

In the cured film, the fluororesin layer and the polyester layer may be completely separated, or part of the fluororesin may be present in the form of islands in the polyester layer (sea), or part of the fluororesin may be present in the polyester layer with such a concentration gradient that its concentration gradually decreases from the fluororesin layer towards the substrate side.

The water contact angle of the cured film surface (fluororesin layer surface) is preferably from 1 to 55 degrees, particularly preferably from 3 to 50 degrees. When the water contact angle of the cured film is at least the above lower limit value, the cured film is less likely to be eroded by an organic acid component derived from feces of birds or carcasses of insects, and also, occurrence of mold on the cured film surface is suppressed (the occurrence of mold is likely to lead to poor appearance). When the water contact angle of the cured film is at most the above upper limit value, the cured film is excellent in stain resistance.

The thickness of the cured film is preferably from 20 to 1,000 μm, more preferably from 20 to 500 μm, particularly preferably from 20 to 300 μm. In an application where a high level of weather resistance is required, such as an outdoor unit for an air conditioner installed along a coast, or a traffic signal pole or indicator, from 100 to 200 μm is preferred. Here, when the thickness of the cured film is thick, such can be achieved by selecting a fluidized dipping method, as will be described later.

The thickness of the fluororesin layer is preferably from 0.1 to 20 μm, particularly preferably from 0.5 to 15 μm. When the thickness of the fluororesin layer is at least the above lower limit value, the weather resistance of the cured film will be excellent. When the thickness of the fluororesin layer is at most the above upper limit value, it is possible to reduce the cost for the cured film.

<Contents of Respective Components in Cured Film>

The ratio ((A)/(B)) of the amount of the cured product of fluorinated polymer (A) as calculated as the fluorinated polymer (A) to the amount of the cured product of polyester polymer (B) as calculated as the polyester compound (B), contained in the entire cured film, is preferably from 90/10 to 10/90 (mass ratio), more preferably from 85/15 to 15/80 (mass ratio), particularly from 80/20 to 20/80 (mass ratio). When the proportion of the cured product of fluorinated polymer (A) is at least the above lower limit value, the weather resistance of the cured film will be excellent. When the proportion of the cured product of polyester polymer (B) is at least the above lower limit value, it is possible to reduce the cost of the cured film.

Here, the amount as calculated as the fluorinated polymer (A) is an amount excluding the amount of the curing agent (C) reacted with the fluorinated polymer (A) from the cured product of fluorinated polymer (A), and in a case where the fluorinated polymer (A) is a non-curable heat-meltable fluorinated polymer, it is the amount of such a polymer itself. The amount as calculated as the polyester polymer (B) is also the same. Therefore, the ratio of the amount as calculated as the fluorinated polymer (A) to the amount as calculated as the polyester polymer (B) is equal to the ratio of the fluorinated polymer (A) to the polyester polymer (B) in the powder coating material, which will be described later. Also, the proportion of another component to the amount as calculated as the fluorinated polymer (A) and the amount as calculated as the polyester polymer (B) is equal to the proportion to the fluorinated polymer (A) and the polyester polymer (B) in the powder coating material.

The content of the ultraviolet absorber (D) in the cured film is preferably from 0.1 to 20 parts by mass, particularly preferably from 0.2 to 15 parts by mass, per 100 parts by mass of the amount as calculated as the fluorinated polymer (A) in the cured film. When the content of the ultraviolet absorber (D) contained in the cured film is at least the above lower limit value, the effect for protecting the polyester layer can be obtained sufficiently. In particular, since the ultraviolet absorber (D) tends to be gradually decomposed by ultraviolet rays, it is preferably at least the lower limit value from the viewpoint of protection of the polyester layer for a long period of time. When the content of the ultraviolet absorber (D) contained in the cured film is at most the upper limit value, yellowing coloration of the cured film can be prevented.

The content of titanium oxide (E) in the cured film is preferably from 20 to 200 parts by mass, particularly preferably from 50 to 150 parts by mass, per 100 parts by mass of the polyester polymer (B) in the cured film.

In a case where the cured film contains a light stabilizer (G), the content of the light stabilizer (G) in the cured film is preferably from 0.05 to 20 parts by mass, particularly preferably from 0.1 to 15 parts by mass, per 100 parts by mass of the amount calculated as the polyester polymer (B) in the cured film. When the content of the light stabilizer contained in the cured film (G) is at least the above lower limit value, the effect for protecting the polyester layer can be obtained sufficiently. When the content of the light stabilizer (G) contained in the cured film exceeds the upper limit value, the effect will be saturated.

In a case where the cured film contains other components (H), the total content of other components (H) is preferably at most 45 mass %, particularly preferably at most 30 mass %, in the cured film (100 mass %). When an acrylic resin is used as other component (H), the content of the acrylic resin is preferably from 1 to 10 mass % in the cured film (100 mass %).

When the total of the respective atom number concentrations of C element, O element, F element and Ti element present in a region (I) within 5 μm in depth from the surface of the cured film as obtained by the following method (1) is set to be 100%, the atom number concentration of Ti element is from 0 to 9%, preferably from 0 to 7.5%.

Further, when the total of the respective atom number concentrations of C element, O element, F element and Ti element present in a region (II) from 10 μm in depth to 60 μm in depth from the surface of the cured film as obtained by the following method (2) is set to be 100%, the atom number concentration of Ti element is from 8.5 to 15%, preferably from 8.5 to 10%.

Method (1):

By observing a cross section of the cured film by a scanning electron microscope (hereinafter referred to also as "SEM") equipped with an energy dispersive X-ray analyzer (hereinafter referred to also as "EDX"), the respective atom number concentrations of C element, O element, F element and Ti element present in the region (I) are analyzed by EDX, to determine the atom number concentration of Ti element, when the total of the respective atom number concentrations of C element, O element, F element and Ti element is set to be 100%.

Method (2):

By observing a cross section of the cured film by SEM equipped with EDX, with respect to the following region (II-1) in a case where the thickness of the cured film is at least 20 μm and less than 30 μm, the following regions (II-1) to (II-2) in a case where the thickness of the cured film is at least 30 μm and less than 40 μm, the following regions (II-1) to (II-3) in a case where the thickness of the cured film is at least 40 μm and less than 50 μm, the following regions (II-1) to (II-4) in a case where the thickness of the cured film is at least 50 μm and less than 60 μm, the following regions (II-1) to (II-5) in a case where the thickness of the cured film is at least 60 μm, the respective atom number concentrations of C element, O element, F element and Ti element present in the respective regions are analyzed by EDX, to determine the atom number concentration of Ti element, when the total of the respective atom number concentrations of C element, O element, F element and Ti element is set to be 100%, in each region, whereupon the atom number concentrations of Ti element in the respective regions are summed up and divided by the number of regions to obtain an average value:

Region (II-1): a region beyond 1 0 μm and at most 20 μm in depth from the surface of the cured film, Region (II-2): a region beyond 20 μm and at most 30 μm in depth from the surface of the cured film, Region (II-3): a region beyond 30 μm and at most 40 μm in depth from the surface of the cured film, Region (II-4): a region beyond 40 μm and at most 50 μm in depth from the surface of the cured film, Region (II-5): a region beyond 50 μm and at most 60 μm in depth from the surface of the cured film.

When the atom number concentration of Ti element present in the region (I) and the atom number concentration of Ti element present in the region (II), are within the above ranges, titanium oxide (E) is eccentrically distributed on the substrate side and is not present so much on the surface side, whereby it is possible to suppress the photocatalytic reaction by titanium dioxide (E) at the surface side exposed to moisture, and thus, it is possible to suppress deterioration of the cured film.

The proportion of the ultraviolet absorber (D) contained in the region (I) (100 mass %) as obtained by the following method (3) is from 0.5 to 10 mass %, preferably from 1 to 9 mass %, particularly preferably from 1 to 8 mass %.

Method (3):

By scraping off the region (I) with a cutter, the obtained powder is subjected to high performance liquid chromatography analysis, whereby the amount of the ultraviolet absorber (D) per unit mass in the powder is obtained from a peak derived from the ultraviolet absorber (D) by using a calibration curve prepared beforehand.

When the proportion of the ultraviolet absorber (D) contained in the region (I) is at least the above lower limit value, the effect for protecting the polyester layer can be obtained sufficiently. In particular, since the ultraviolet absorber (D) tends to be gradually decomposed by e.g. ultraviolet rays, it is preferably at least the above lower limit value with a view to protecting the polyester layer over a long period of time. When the proportion of the ultraviolet absorber (D) contained in the region (I) is at most the above upper limit value, yellowing coloration of the cured film can be prevented.

[Powder Coating Material]

The powder coating material of the present invention may be one comprising a fluorinated polymer (A), a polyester polymer (B), an ultraviolet absorber (D) and titanium oxide (E), and its formulation is not particularly limited.

The powder coating material may contain, as the case requires, a curing agent (C), a curing catalyst (F), a light stabilizer (G) and other components (H).

As the powder coating material, the following powder coating material (I) or the after-described powder coating material (II) is preferred, since production of the powder coating material itself is thereby not cumbersome, and it is thereby easy to form a cured film having a fluororesin layer and a polyester layer.

[Powder Coating Material (I)]

The powder coating material (I) contains at least one type of powder (X) made of a composition (α) comprising a fluorinated polymer (A), a polyester polymer (B), an ultraviolet absorber (D) and titanium oxide (E).

The content of the powder (X) in the powder coating material (I) is preferably from 50 to 100 mass %, more preferably from 70 to 100 mass %, further preferably from 80 to 100 mass %, particularly preferably from 90 to 100 mass %. The powder coating material (I) may be a coating material composed solely of the powder (X).

The powder (X) contained in the powder coating material (I) contains a polyester polymer (B) which can be layer-separated without being compatible with the fluorinated polymer (A), whereby when the powder coating material (I) is applied on a substrate by one coating to form a coating film made of a melt of the powder coating material (I), then reactive components in the coating film are reacted, and the coating film is cooled and cured, a fluororesin layer composed mainly of a cured product of the fluorinated polymer (A) contained in the powder (X) and a polyester layer composed mainly of a cured product of the polyester polymer (B) contained in the powder (X) are layer-separated. At that time, the ultraviolet absorber (D) having high affinity to the fluorinated polymer (A) will be eccentrically distributed in the fluororesin layer, while titanium oxide (E) having high affinity to the polyester polymer (B) will be eccentrically distributed in the polyester layer. In the present invention, such reaction, curing and layer separation may proceed simultaneously. The polyester layer is disposed on the substrate side, and the fluororesin layer is disposed on the air side.

(Composition (α))

The composition (α) comprises a fluorinated polymer (A), a polyester polymer (B), an ultraviolet absorber (D) and titanium oxide (E). As the case requires, it may contain a curing agent (C), a curing catalyst (F), a light stabilizer (G), and other components (H).

<Fluorinated Polymer (A)>

The fluorinated polymer (A) may be a homopolymer or copolymer of fluoroolefin. The copolymer may, for example, be a copolymer of at least two types of fluoroolefin, a copolymer of at least one type of fluoroolefin and at least one type of fluorinated monomer other than fluoroolefin, a copolymer of at least one type of fluoroolefin and at least one type of monomer having no fluorine atom, or a copolymer of at least one type of fluoroolefin, at least one type of fluorinated monomer other than fluoroolefin, and at least one type of monomer having no fluorine atom.

The fluoroolefin is a compound having at least one hydrogen atom in a hydrocarbon olefin (general formula: $C_nH_{2n}$) substituted by a fluorine atom.

The number of carbon atoms in the fluoroolefin is preferably from 2 to 8, more preferably from 2 to 6.

The number of fluorine atoms in the fluoroolefin is at least 2, particularly preferably 3 or 4. When the number of fluorine atoms is at least 2, weather resistance of the cured film will be excellent. In the fluoroolefin, at least one hydrogen atom not substituted by a fluorine atom may be substituted by a chlorine atom. When the fluoroolefin has a chlorine atom, it will be easy to disperse titanium oxide (E) or the like (in particular, a colored organic pigment such as cyanine blue or cyanine green) in the fluorinated polymer (A). Further, the glass transition temperature of the fluorinated polymer (A) can be designed to be at least 30° C., whereby it is possible to prevent blocking of the cured film.

As the fluoroolefin, at least one member selected from the group consisting of tetrafluoroethylene (hereinafter referred to also as "TFE"), chlorotrifluoroethylene (hereinafter referred to also as "CTFE"), hexafluoropropylene, vinylidene fluoride and vinyl fluoride, is preferred, and TFE or CTFE is particularly preferred.

As the fluoroolefin, one type may be used alone, or two or more types may be used in combination.

As fluoroolefin units, units formed directly by polymerization of a fluoroolefin are preferred.

The fluorinated monomer other than fluoroolefin may, for example, be a fluoro(alkyl vinyl ether) or a perfluoro(alkyl vinyl ether).

The monomer having no fluorine atom may be a monomer having no reactive group, or a monomer having a reactive group. The monomer having no reactive group may, for example, be an olefin or a vinyl ether having no reactive group, and the monomer having a reactive group may, for example, be a vinyl monomer having a hydroxy group or a vinyl monomer having a carboxy group.

The fluorinated polymer having no reactive group among the fluorinated polymers (A) may, for example, be a TFE-perfluoro(alkyl vinyl ether) copolymer (hereinafter referred to also as "PFA"), a TFE-hexafluoropropylene copolymer, a TFE-perfluoro(alkyl vinyl ether)-hexafluoropropylene copolymer, an ethylene-TFE copolymer (hereinafter referred to also as "ETFE"), a polyvinylidene fluoride (hereinafter referred to also as "PVDF"), a polyvinyl fluoride, a polychlorotrifluoroethylene, or an ethylene-CTFE copolymer.

The fluorinated polymer having no reactive group may further have, as the case requires, units derived from other monomers within a range not impair the essential properties thereof.

Other monomers are monomers other than the monomers that form the essential units as units that constitute the fluorinated polymer having no reactive group (for example, ethylene and TFE in ETFE, or TFE and a perfluoro(alkyl vinyl ether) in PFA).

As such other monomer, vinylidene fluoride is particularly preferred, since the polymer will thereby be excellent in adhesion to a substrate (in particular an aluminum substrate), and an aluminum curtain wall can be easily fixed by a sealing agent.

The melting point of the fluorinated polymer (A) having no reactive group is preferably at most 300° C., more preferably at most 200° C., particularly preferably at most 180° C. When the melting point of the fluorinated polymer (A) is at most the above upper limit value, the cured film will be excellent in surface smoothness.

As the fluorinated polymer having no reactive group, PVDF is preferred from the viewpoint of excellent flexibility and impact resistance of the fluororesin layer. When the composition (α) contains PVDF as a fluorinated polymer (A), from the viewpoint of excellent adhesion between the fluororesin layer and the polyester layer, it preferably further contains an acrylic resin as other component (H).

As the fluorinated polymer (A), a fluorinated polymer having a reactive group is preferred, from the viewpoint of excellent stain resistance, water resistance, acid resistance and alkali resistance. The reactive group may be a hydroxy group, a carboxy group, an amino group or the like. As the fluorinated polymer having a reactive group, a fluorinated polymer having a hydroxy group (hereinafter referred to also as "hydroxy group-containing fluorinated polymer (A1)") or a fluorinated polymer containing a carboxy group (hereinafter referred to also as "carboxy group-containing fluorinated polymer (A2)") is particularly preferred. The hydroxy group-containing fluorinated polymer (A1) or carboxy group-containing fluorinated polymer (A2) contains a hydroxy group or carboxy group, whereby in the case of using an isocyanate-type curing agent (especially a blocked isocyanate curing agent) as the curing agent (C), it is excellent in curing speed. Further, it is preferred in that titanium oxide (E), etc. can easily be dispersed, and a cured film having high gloss (60-degree gloss being at least 60%) is obtainable.

<Hydroxy Group-containing Fluorinated Polymer (A1)>

As the hydroxy group-containing fluorinated polymer (A1), preferred is a hydroxy group-containing fluorinated polymer having units derived from a fluoroolefin, units derived from a monomer having a hydroxy group copolymerizable with a fluoroolefin (hereinafter referred to as "monomer (m1)") and, as the case requires, units derived from another monomer other than a fluoroolefin and monomer (m1) (hereinafter referred to as "monomer (m2)").

The hydroxy group-containing fluorinated polymer (A1) may be a hydroxy group-containing fluorinated polymer having hydroxy groups introduced by conversion of reactive groups in a polymer. As such a hydroxy group-containing fluorinated polymer, preferred is a fluorinated polymer which is obtainable by reacting a fluorinated polymer having units derived from a fluoroolefin, units derived from a monomer having a reactive functional group other than a hydroxy group and, as the case requires, the above-mentioned monomer (m2) with a compound having a hydroxy group and a second reactive functional group reactive with the above-mentioned reactive functional group.

The monomer (monomer (m1), monomer (m2) or the like) to be copolymerized with a fluoroolefin, may be a monomer having fluorine atoms other than a fluoroolefin, but is preferably a monomer having no fluorine atom.

The monomer (m1) is a monomer having a hydroxy group.

The monomer having a hydroxyl group may, for example, be allyl alcohol, a hydroxyalkyl vinyl ether (2-hydroxyethyl vinyl ether, 4-hydroxybutyl vinyl ether, cyclohexanediol monovinyl ether, etc.), a hydroxyalkyl allyl ether (2-hydroxyethyl allyl ether, etc.), a vinyl hydroxy alkanoate (vinyl hydroxypropionate, etc.), a hydroxyalkyl (meth)acrylate (hydroxyethyl (meth)acrylate, etc.).

As the monomer (m1), one type may be used alone, or two or more types may be used in combination.

The monomer (m2) may, for example, be a vinyl ether, allyl ether, carboxylic acid vinyl ester, carboxylic acid allyl ester or olefin, having no reactive group.

The vinyl ether having no reactive group may, for example, be a cycloalkyl vinyl ether (cyclohexyl vinyl ether (hereinafter referred to also as "CHVE"), etc.), or an alkyl vinyl ether (nonyl vinyl ether, 2-ethylhexyl vinyl ether, hexyl vinyl ether, ethyl vinyl ether, n-butyl vinyl ether, tert-butyl vinyl ether, etc.).

The allyl ether having no reactive group may, for example, be an alkyl allyl ether (ethyl allyl ether, hexyl allyl ether, etc.).

The carboxylic acid vinyl ester having no reactive group may, for example, be a vinyl ester of a carboxylic acid (acetic acid, butyric acid, pivalic acid, benzoic acid, propionic acid, etc.). Further, as a vinyl ester of a carboxylic acid having a branched alkyl group, commercially available VeoVa-9 or VeoVa-10 (each manufactured by Shell Chemical Co., trade name) may be used.

The carboxylic acid allyl ester having no reactive group may, for example, be an allyl ester of a carboxylic acid (acetic acid, butyric acid, pivalic acid, benzoic acid, propionic acid, etc.).

The olefin may, for example, be ethylene, propylene or isobutylene.

As the monomer (m2), a cycloalkyl vinyl ether is preferred, and CHVE is particularly preferred, from such a viewpoint that the glass transition temperature of the hydroxy group-containing fluorinated polymer (A1) can be designed to be at least 30° C. and it is possible to prevent blocking of the cured film.

The monomer (m2) is preferably one having a linear or branched alkyl group having 3 or more carbon atoms, from the viewpoint of excellent flexibility of the cured film.

As the monomer (m2), one type may be used alone, or two or more types may be used in combination.

As a combination of monomers constituting the hydroxy group-containing fluorinated polymer (A1), from the viewpoint of weather resistance, adhesion, flexibility and blocking resistance, the following combination (1) is preferred, and combination (2) or (3) is particularly preferred.

Combination (1)
 Fluoroolefin: TFE or CTFE,
 Monomer (m1): hydroxyalkyl vinyl ether,
 Monomer (m2): at least one member selected from the group consisting of a cycloalkyl vinyl ether, an alkyl vinyl ether and a carboxylic acid vinyl ester.

Combination (2)
 Fluoroolefin: TFE,
 Monomer (m1): hydroxyalkyl vinyl ether,
 Monomer (m2): CHVE or tert-butyl vinyl ether.

Combination (3)
 Fluoroolefin: CTFE,
 Monomer (m1): hydroxyalkyl vinyl ether,
 Monomer (m2): CHVE or tert-butyl vinyl ether.

The proportion of the fluoroolefin units is preferably from 30 to 70 mol %, particularly preferably from 40 to 60 mol %, in all units (100 mol %) in the hydroxy group-containing fluorinated polymer (A1). When the fluoroolefin units are at least the above lower limit value, weather resistance of the cured film will be excellent. When the fluoroolefin units are at most the above upper limit value, adhesion between the fluororesin layer and the polyester layer will be excellent when the layers are separated.

The proportion of the monomer (m1) units is preferably from 0.5 to 20 mol %, particularly preferably from 1 to 15 mol %, in all units (100 mol %) in the hydroxy group-containing fluorinated polymer (A1). When the proportion of the monomer (m1) units is at least the above lower limit value, adhesion between the fluororesin layer and the polyester layer will be excellent when the layers are separated. When the proportion of the monomer (m1) units is at most the above upper limit value, scratch resistance of the cured film will be excellent.

The proportion of the monomer (m2) units is preferably from 20 to 60 mol %, particularly preferably from 30 to 50 mol %, in all units (100 mol %) in the hydroxy group-containing fluorinated polymer (A1). When the proportion of the monomer (m2) units is at least the above lower limit value, the glass transition temperature of the hydroxy group-containing fluorinated polymer (A1) will be proper, and it will be easy to produce a powder coating material. When the proportion of the monomer (m2) units is at most the above upper limit value, adhesion between the fluororesin layer and the polyester layer will be excellent when the layers are separated.

The number average molecular weight of the hydroxy group-containing fluorinated polymer (A1) is preferably from 3,000 to 50,000, more preferably from 5,000 to 30,000. When the number average molecular weight of the hydroxy group-containing fluorinated polymer (A1) is at least the above lower limit value, water resistance and salt water resistance of the cured film will be excellent. When the number average molecular weight of the hydroxy group-containing fluorinated polymer (A1) is at most the above upper limit value, surface smoothness of the cured film will be excellent.

The hydroxy value of the hydroxy group-containing fluorinated polymer (A1) is preferably from 5 to 100 mgKOH/g, more preferably from 10 to 80 mgKOH/g. When the hydroxy value of the hydroxy group-containing fluorinated polymer (A1) is at least the above lower limit value, adhesion between the fluororesin layer and the polyester layer will be excellent when the layers are separated. When the hydroxy value of the hydroxy group-containing fluorinated polymer (A1) is at most the above upper limit value, the cured film will be excellent in crack resistance under temperature cycles with a high temperature of at least 100° C. and a low temperature of at most 10° C. Measurement of the hydroxy value is carried out in accordance with JIS K1557-1: 2007 (ISO 14900: 2001).

The glass transition temperature of the hydroxy group-containing fluorinated polymer (A1) is preferably from 30 to 150° C., more preferably from 35 to 120° C., particularly preferably from 35 to 100° C. When the glass transition temperature of the hydroxy group-containing fluorinated polymer (A1) is at least the above lower limit value, it will be easy to produce a powder coating material. When the glass transition temperature of the hydroxy group-containing fluorinated polymer (A1) is at most the above upper limit value, surface smoothness of the cured film will be excellent.

<Carboxy Group-containing Fluorinated Polymer (A2)>

The carboxy group-containing fluorinated polymer (A2) may, for example, be obtained by the following methods.

A method of reacting a hydroxy group of the hydroxy group-containing fluorinated polymer (A1) and an acid anhydride in an organic solvent, to let an ester bond and a carboxy group be formed.

A method of melt-kneading the hydroxy group-containing fluorinated polymer (A1) and an acid anhydride, to let a hydroxy group of the hydroxy group-containing fluorinated polymer (A1) and the acid anhydride be reacted to let an ester bond and a carboxy group be formed.

A carboxy group in the carboxy group-containing fluorinated polymer (A2) obtained by such methods, is derived from an acid anhydride. The carboxy group-containing fluorinated polymer (A2) may have a hydroxyl group derived from the hydroxy group-containing fluorinated polymer (A1) as the raw material.

In a case where unreacted raw materials (the hydroxyl-containing fluorinated polymer (A1) and the acid anhydride) are contained in the composition ($\alpha$), such unreacted raw materials are treated as a carboxy group-containing fluorinated polymer (A2).

As the acid anhydride, a compound having a molecular weight of from 90 to 200 is preferred from the viewpoint of excellent reactivity with the hydroxy group-containing fluorinated polymer (A1). From the viewpoint of excellent reactivity with the hydroxy group-containing fluorinated polymer (A1), a compound having from 4 to 15 carbon atoms is preferred. From the viewpoint of excellent reactivity with the hydroxy group-containing fluorinated polymer (A1), a compound having a melting point of from 20 to 180° C. is preferred.

As the acid anhydride, a dibasic acid anhydride may be mentioned.

As the dibasic acid anhydride, succinic anhydride (molecular weight: 100.1, melting point: 120° C., number of carbon atoms: 4), glutaric anhydride (molecular weight: 114.1, melting point: 52° C., number of carbon atoms: 5), itaconic anhydride (molecular weight: 112.1, melting point: 67° C., number of carbon atoms: 5), anhydrous 1,2-cyclohexane dicarboxylic acid (hexahydrophthalic anhydride) (molecular weight: 154.0, melting point: 35° C., number of carbon atoms: 8), anhydrous cis-4-cyclohexene-1,2-dicarboxylic acid (molecular weight: 152.0, melting point: 66° C., number of carbon atoms: 8), phthalic anhydride (molecular weight: 148.1, melting point: 131° C., number of carbon atoms: 8), 4-methylhexahydrophthalic anhydride (molecular weight: 168.0, melting point: 22° C., number of carbon atoms: 9), anhydrous 1,8-naphthalic acid (molecular weight: 198.2, melting point: 17° C., number of carbon atoms: 11), maleic anhydride (molecular weight: 98.1, melting point: 52.6° C., number of carbon atoms: 4), etc. may be mentioned.

The glass transition temperature of the carboxy group-containing fluorinated polymer (A2) is preferably from 30 to 150° C., more preferably from 35 to 120° C., particularly preferably from 35 to 100° C. When the glass transition temperature of the carboxy group-containing fluorinated polymer (A2) is at least the above lower limit value, it will be easy to produce a powder coating material. When the glass transition temperature of the carboxy group-containing fluorinated polymer (A2) is at most the above upper limit value, surface smoothness of the cured film will be excellent.

<Polyester Polymer (B)>

The polyester polymer (B) may be one having units derived from a polycarboxylic acid compound and units derived from a polyhydric alcohol compound, and, as the case requires, having units other than these two types of units (for example, units derived from a hydroxy carboxylic acid compound).

A terminal of the polymer chain of the polyester polymer is a monovalent unit, and when the terminal unit is a unit derived from a polycarboxylic acid compound, such a terminal unit has a carboxyl group, and when the terminal unit is a unit derived from a polyhydric alcohol compound, such a terminal unit has a hydroxy group.

Units other than the terminal units are composed of divalent or higher valent units, and a linear polymer is composed solely of divalent units except for the terminal units. That is, a linear polyester polymer consists solely of divalent units derived from a polycarboxylic acid compound and divalent units derived from a polyhydric alcohol compound, except for the terminal units. A branched polyester polymer has at least one trivalent or higher valent unit and consists substantially solely of divalent units except for such a trivalent or higher valent unit and the terminal units. The trivalent or higher valent unit may, for example, be a unit having the respective hydroxy groups removed from three or more carboxy groups in a trivalent or higher polycarboxylic acid compound, or a unit having the respective hydrogen atoms removed from three or more hydroxyl groups in a trihydric or higher hydric alcohol compound.

Hereinafter, units derived from a polycarboxylic acid compound will be referred to also as "polycarboxylic acid units", and units derived from a polyhydric alcohol compound will be referred to also as "polyhydric alcohol units".

The polyester polymer (B) is preferably a linear polymer or a branched polymer having a small number of branches, particularly preferably a linear polymer. A branched polymer having many branches tends to have a higher softening point or melting temperature, and if the polyester polymer (B) is a branched polymer, the softening point is preferably at most 200° C. The polyester polymer (B) is preferably a polyester polymer which is solid at room temperature and has a softening point of from 100 to 150° C.

The number-average molecular weight of the polyester polymer (B) is preferably at most 5,000 from such a viewpoint that the melt viscosity of the coating film can thereby be made properly low. The mass average molecular weight of the polyester polymer (B) is preferably from 2,000 to 20,000, particularly preferably from 2,000 to 10,000, from such a viewpoint that the melt viscosity of the coating film can thereby be made properly low. As the polyester polymer (B), one having a number average molecular weight of at most 5,000 and a mass average molecular weight of from 2,000 to 20,000, is more preferred, and one having a number average molecular weight of at most 5,000 and a mass average molecular weight of from 2,000 to 10,000, is particularly preferred.

The polyester polymer (B) usually has reactive groups capable of reacting with a curing agent (C). At least a portion of the terminal unit of the polymer chain of the polyester polymer (B) is preferably a monovalent polycarboxylic acid unit or a monovalent polyhydric alcohol unit, and in the former case, a free carboxy group of the unit and in the latter case, a free hydroxy group of the unit, functions as a reactive group. A unit having a reactive group may be a unit other than the terminal unit. For example, a divalent polyhydric alcohol unit derived from a polyhydric alcohol compound having three or more hydroxy groups, is a unit having a free hydroxy group, and therefore, the polyester polymer (B) may have a divalent or higher valent unit having such a reactive group.

The reactive groups in the polyester polymer (B) are preferably hydroxy groups, since the cured film will thereby be excellent in water resistance, alkali resistance and acid resistance. A polyester polymer usually has hydroxy groups and carboxy groups, and as the polyester polymer (B), a polyester polymer mainly having hydroxy groups is preferred.

The hydroxy value of the polyester polymer (B) is preferably from 20 to 100 mgKOH/g, particularly preferably from 20 to 80 mgKOH/g. The acid value of the polyester polymer (B) is preferably from 1 to 80 mgKOH/g, particularly preferably from 3 to 50 mgKOH/g. Measurements of the hydroxyl value and the acid value are carried out in accordance with JIS K0070: 1992.

The polyester polymer (B) is preferably a polyester polymer having units derived from a $C_{8-15}$ aromatic polycarboxylic acid compound and units derived from a $C_{2-10}$ polyhydric alcohol compound, from the viewpoint of excellent adhesion between the polyester layer and the fluororesin layer, from the viewpoint of excellent impact resistance of the cured film, and from the viewpoint of excellent dispersibility of e.g. titanium oxide (E).

As the polycarboxylic acid units, units derived from a $C_{8-15}$ aromatic polycarboxylic acid compound, are preferred. The $C_{8-15}$ aromatic polycarboxylic acid compound is a compound having an aromatic ring and two or more carboxy groups, wherein carboxy groups are attached to carbon atoms of the aromatic ring. Here, it may be an anhydride with a structure having two carboxy groups dehydrated.

The aromatic ring is preferably a benzene ring or a naphthalene ring, particularly preferably a benzene ring. In the case of a benzene ring, there may be two benzene rings present in one molecule.

The number of carboxy groups in the aromatic polycarboxylic acid compound is preferably from 2 to 4, particularly preferably 2.

The $C_{8-15}$ aromatic polycarboxylic acid compound may, for example, be phthalic acid, isophthalic acid, terephthalic acid, naphthalene dicarboxylic acid, trimellitic acid, pyromellitic acid, phthalic anhydride or the like.

As the polycarboxylic acid units, units derived from isophthalic acid are preferred from the viewpoint of excellent weather resistance of the cured film.

As the polyhydric alcohol units, units derived from a $C_{2-10}$ polyhydric alcohol compound are preferred. The $C_{2-10}$ polyhydric alcohol compound is a compound having two or more hydroxy groups. As the polyhydric alcohol compound, an aliphatic polyhydric alcohol compound or an alicyclic polyhydric alcohol compound is preferred, and an aliphatic polyhydric alcohol compound is particularly preferred. The number of hydroxy groups in the polyhydric alcohol compound is preferably 2 to 4, particularly preferably 2.

The $C_{2-10}$ polyhydric alcohol compound may, for example, be ethylene glycol, diethylene glycol, triethylene glycol, 1,2-propanediol, 1,3-propanediol, 1,3-butanediol, 1,4-butanediol, 1,5-pentanediol, neopentyl glycol, Spiro glycol, 1,10-decanediol, 1,4-cyclohexane dimethanol, trimethylol ethane, trimethylol propane, glycerine, pentaerythritol, etc.

The polyhydric alcohol units are preferably units derived from a $C_{3-8}$ polyhydric alcohol compound, particularly preferably units derived from a $C_{4-6}$ polyhydric alcohol compound, since adhesion to a substrate will be thereby excellent, and flexibility is excellent whereby even if heat history (thermal cycling) is exerted, delamination between the polyester layer and the fluororesin layer is less likely to occur.

As the polyhydric alcohol compound, neopentyl glycol, 1,2-pentanediol, 1,5-pentanediol or trimethylolpropane is preferred, and in view of easy availability, neopentyl glycol or trimethylol propane is particularly preferred.

The polyester polymer (B) can be produced by a known method for producing a polyester polymer for a powder coating material, by using, as raw materials, an aromatic polycarboxylic acid compound and a polyhydric alcohol compound. For example, the raw materials are subjected to esterification or ester exchange reaction at from 200 to 280° C., followed by a polycondensation reaction at from 230 to 290° C. by using a catalyst under reduced pressure, and then, a depolymerization reaction is conducted with an alcohol component, to obtain a polyester polymer (B).

In order to facilitate formation of a cured film having a double-layered structure by facilitating layer-separation of the fluororesin layer and the polyester layer in the melting and curing process of the powder coating material, it is preferred that the polyester polymer (B) has a proper ester group concentration and aromatic ring concentration.

The ester group concentration is one having the content of ester groups in the polyester polymer (B) represented by mass %, and can be obtained from the following formula (1).

$$\text{Ester group concentration (\%)} = 2m/[(a+b) \times m + a] \quad (1)$$

m: An average value of the number of units in the polyester polymer, as calculated from an average value of the molecular weight of each unit and a value of the number average molecular weight of the polyester polymer.

a: An average value of the number of carbon atoms in the polyhydric alcohol units.

b: An average value of the number of carbon atoms in the polycarboxylic acid units.

The ester group concentration in the polyester polymer (B) is preferably from 20 to 60 mass %, more preferably from 25 to 50 mass %, particularly preferably from 30 to 40 mass %.

The aromatic ring concentration is one having the content of aromatic rings in the polyester polymer (B) represented by mmoL/g, and can be obtained from the following formula (2).

$$\text{Aromatic ring concentration (mmoL/g)} = [(\text{total number of aromatic rings in the raw materials used to obtain the polyester polymer (moL)}) / (\text{total weight of the raw materials used to obtain the polyester polymer (g)})] \times 1{,}000 \quad (2)$$

The aromatic ring concentration in the polyester polymer (B) is preferably from 20 to 35 mmoL/g, more preferably from 22 to 34 mmoL/g, particularly preferably from 25 to 33 mmoL/g.

Commercial products of the polyester polymer (B) may, for example, be "CRYLCOAT (registered trademark) 4642-3" and "CRYLCOAT (registered trademark) 4890-0", manufactured by DAICEL-ALLNEX LTD., "GV-250", "GV-740" and "GV-175", manufactured by Japan U-PICA Co., Ltd., etc.

<Curing Agent (C)>

The curing agent (C) is a compound to cure a polymer (fluorinated polymer (A), polyester polymer (B)) by reacting with reactive groups of the polymer to cross-link the polymer or to increase the molecular weight. The curing agent (C) has at least two reactive groups capable of reacting with the reactive groups (hydroxy groups, carboxy groups, etc.) of the polymer. The reactive groups of the curing agent (D) are preferably reactive groups capable of reacting when heated and melted, since it is not desirable that they are reactive at room temperature. For example, a blocked isocyanate group is preferred, rather than an isocyanate group having high reactivity at room temperature. A blocked isocyanate group becomes an isocyanate group as the blocking agent is desorbed when the powder coating material is heated and melted, and the isocyanate group will then act as a reactive group.

As the curing agent (C), it is possible to use a known compound, and, for example, a blocked isocyanate curing agent or a β-hydroxyalkyl amine curing agent may be mentioned. The β-hydroxyalkyl amine curing agent may, for example, be a melamine resin, a guanamine resin, a sulfoamide resin, a urea resin, an aniline resin or the like, wherein a hydroxymethyl group or an alkoxymethyl group is bonded to a nitrogen atom of an amino group or an amide group. The epoxy curing agent may, for example, be triglycidyl isocyanurate or the like.

A blocked isocyanate curing agent is particularly preferred from the viewpoint of excellent adhesion to a substrate, processability of the product after coating and water resistance of the cured film.

In the case of a carboxy group-containing fluororesin (A2) having all hydroxy groups in a hydroxy group-containing fluororesin (A1) converted to carboxy groups, the curing agent (C) is preferably a β-hydroxyalkyl amine curing agent or an epoxy curing agent.

As the curing agent (C), one type may be used alone, or two or more types may be used in combination.

The softening temperature of the curing agent (C) is preferably from 10 to 120° C., particularly preferably from 40 to 100° C. When the softening temperature is at least the above lower limit value, the powder coating material will be scarcely cured at room temperature, and granular agglomerates are less likely to be formed. When the softening temperature is at most the above upper limit value, at the time of producing a powder by melt kneading the composition, the curing agent (C) can easily be homogeneously dispersed in the powder, and the obtainable cured film will be excellent in surface smoothness, strength and moisture resistance.

As the blocked isocyanate curing agent, preferred is one which is solid at room temperature.

The blocked isocyanate curing agent is preferably one produced by reacting a polyisocyanate obtained by reacting an aliphatic, aromatic or aromatic-aliphatic diisocyanate and a low molecular compound having active hydrogen, with a blocking agent, for masking.

The diisocyanate may, for example, be tolylene diisocyanate, 4,4'-diphenylmethane diisocyanate, xylylene diisocyanate, hexamethylene diisocyanate, 4,4'-methylenebis(cyclohexyl isocyanate), methylcyclohexane diisocyanate, bis (isocyanatomethyl) cyclohexane, isophorone diisocyanate, dimer acid diisocyanate, lysine diisocyanate or the like.

The low molecular compound having active hydrogen may, for example, be water, ethylene glycol, propylene glycol, trimethylolpropane, glycerin, sorbitol, ethylenediamine, ethanolamine, diethanolamine, hexamethylenediamine, isocyanurate, uretdione, a low molecular weight polyester containing hydroxy groups, polycaprolactone or the like.

The blocking agent may, for example, be an alcohol (methanol, ethanol, benzyl alcohol or the like), a phenol (phenol, cresol or the like), a lactam (caprolactam, butyrolactam or the like), an oxime (cyclohexanone, oxime, methyl ethyl ketoxime or the like) or the like.

<Ultraviolet Absorber (D)>

The composition contains an ultraviolet absorber (D) for the purpose of protecting the polyester layer. By the ultraviolet absorber (D), deterioration of the polyester layer can be prevented, and it is possible to avoid a problem of peeling of the fluororesin layer from the polyester layer.

The ultraviolet absorber (D) is eccentrically distributed in the fluororesin layer, when a cured film with a double-layered structure of the fluororesin layer and the polyester layer has been formed. Since ultraviolet rays tend to mainly degrade the polyester layer, the amount of ultraviolet rays entering into the polyester layer is reduced by the ultraviolet absorber eccentrically distributed in the fluororesin layer.

In order to facilitate the eccentrical distribution of the ultraviolet absorber (D) in the fluororesin layer in the melting and curing process of the powder coating material, it is preferred to select an ultraviolet absorber which is likely to be eccentrically distributed in the fluororesin layer in consideration of the physical properties of the ultraviolet absorber. For example, as between a lipophilic ultraviolet absorber and a hydrophilic ultraviolet absorber, the lipophilic ultraviolet absorber will be more readily eccentrically distributed in the fluororesin layer. Further, the affinity for the fluororesin (A1) may be different depending upon the difference in the type (the difference in the chemical structure), physical properties (molecular weight, melting point, boiling point, etc.), etc. of the ultraviolet absorber.

As the ultraviolet absorber (D), either an organic ultraviolet absorber or an inorganic ultraviolet absorber may be used. As compared with an inorganic ultraviolet absorber, an organic ultraviolet absorber usually has a high lipophilic property, and therefore, as the ultraviolet absorber (D), an organic ultraviolet absorber is more preferred.

As the ultraviolet absorber (D), one type may be used alone, or two or more types may be used in combination.

The organic ultraviolet absorber may, for example, be a salicylate ultraviolet absorber, a benzotriazole ultraviolet absorber, a benzophenone ultraviolet absorber, a cyanoacrylate ultraviolet absorber or the like.

As the organic ultraviolet absorber, a compound having a molecular weight of from 200 to 1,000 is preferred. When the molecular weight is at least 200, it is less likely to be volatilized in the melting and curing process of the powder coating material and can remain in the coating film. When the molecular weight is at most 1,000, it can stay in the fluororesin layer.

As the organic ultraviolet absorber, a compound having a melting point of from 50 to 150° C. is preferred. When the melting point is at least 50° C., it is less likely to be volatilized in the melting and curing process of the powder coating material and can remain in the coating film. When the melting point is at most 150° C., it is readily meltable in the melting and curing process of the powder coating material, and can remain in the fluororesin layer.

As the organic ultraviolet absorber, a compound having a volatilization temperature of from 180 to 450° C. is preferred, and a compound having a volatilization temperature of from 220 to 400° C. is particularly preferred. In the melting and curing process of the powder coating material, a temperature condition of from 150 to 220° C. is required, and therefore, within the above range, the organic ultraviolet absorber is less likely to be volatilized and can remain in the fluororesin layer at the time of double-layer separation in the melting and curing process of the powder coating material.

Commercial products of the organic ultraviolet absorber may, for example, be "Tinuvin (registered trademark) 326" (molecular weight: 315.8, melting point: 139° C.), "Tinuvin (registered trademark) 405" (molecular weight: 583.8, melting point: 74 to 77° C.), "Tinuvin (registered trademark) 460" (molecular weight: 629.8, melting point: 93 to 102° C.), "Tinuvin (registered trademark) 900" (molecular weight: 447.6, melting point: 137 to 141° C.) and "Tinuvin (registered trademark) 928" (molecular weight: 441.6, melting point: 109 to 113° C.), manufactured by BASF, "Sanduvor (registered trademark) VSU powder" (molecular weight: 312.0, melting point: 123 to 127° C.) manufactured by Clariant, "Hastavin (registered trademark) PR-25 Gran" (molecular weight: 250.0, melting point: 55 to 59° C.) manufactured by Clariant, etc.

The inorganic ultraviolet absorber may, for example, be a filler-type inorganic ultraviolet absorber including an ultraviolet absorbing oxide (zinc oxide, cerium oxide or the like).

The inorganic ultraviolet absorber is preferably composite particles of titanium oxide and zinc oxide, composite particles of titanium oxide and cerium oxide, composite particles of zinc oxide and cerium oxide, composite particles of titanium oxide, zinc oxide and cerium oxide, or the like.

<Titanium Oxide (E)>

Titanium oxide (E) tends to accelerate a photocatalytic reaction in a hot and humid area. The photocatalytic reaction is promoted by moisture and ultraviolet radiation. Titanium oxide (E) tends to be eccentrically distributed in the polyester layer. However, the fluororesin layer at the outermost surface of the cured film in the coated article of the present invention is less likely to let moisture pass therethrough, and therefore, moisture does not easily migrate into the polyester layer from the surface of the cured film. Therefore, since the moisture is less, even if titanium dioxide (E) is present in the polyester layer, the polyester layer is hardly deteriorated by a photocatalytic reaction. Therefore, even when the powder coating material contains titanium oxide (E) as a pigment, a cured film having excellent weather resistance can be obtained.

Titanium oxide (E) is preferably one having surface treatment applied not to let a photocatalytic reaction proceed, specifically titanium oxide surface-treated with e.g. silica, alumina, zirconia, selenium, an organic component (such as a polyol), etc., particularly preferably titanium oxide having the content of titanium oxide adjusted to be from 83 to 90 mass % by such surface treatment. When the titanium oxide content is at least the above lower limit value, the cured film will be excellent in whiteness. When the titanium oxide content is at most the above upper limit value, the polyester layer will be hardly deteriorated, and the fluororesin layer will be less likely to be peeled off.

Commercial products of titanium oxide (E) may, for example, be "Tipaque (registered trademark) PFC105" (titanium oxide content: 87 mass %), "Tipaque (registered trademark) CR95" (titanium oxide content: 90 mass %), manufactured by Ishihara Sangyo Kaisha, Ltd., "D918" (titanium oxide content: 85 mass %), manufactured by Sakai Chemical Co., "Ti-Pure (registered trademark) R960" (titanium oxide content: 89 mass %), "Ti-Select (registered trademark)" (titanium oxide content: 90 mass %), manufactured by DuPont, etc.

<Curing catalyst (F)>

The curing catalyst (F) is one to accelerate the curing reaction and to provide good chemical properties and physical properties to a cured film.

In the case of using a blocked isocyanate curing agent, the curing catalyst (F) is preferably a tin catalyst (tin octylate, tributyltin laurate, dibutyltin dilaurate or the like).

As the curing catalyst, one type may be used alone, or two or more types may be used in combination.

<Light Stabilizer (G)>

The light stabilizer (G) is one to protect the polyester layer from ultraviolet rays that have passed through the fluororesin layer.

As the light stabilizer (G), from the viewpoint of easy migration to the polyester layer in the melting and curing process of the powder coating material, a hindered amine light stabilizer is preferred, and a hindered amine light stabilizer having a molecular weight of from 300 to 5,000 and a melting point of from 50 to 250° C. is more preferred. From the viewpoint of uniform diffusion in the composition during kneading, a hindered amine light stabilizer having a molecular weight of from 400 to 4,000 and a melting point of from 60 to 200° C. is further preferred.

As the light stabilizer (G), a compound having a volatilization temperature of from 180 to 450° C. is preferred, and a compound having a volatilization temperature of from 220 to 400° C. is particularly preferred. Since a temperature condition of from 150 to 220° C. is required in the melting and curing process of the powder coating material, within the above range, it is less likely to be volatilized and tends to easily remain in the polyester layer in the melting and curing process of the powder coating material.

As the light stabilizer (G), one type may be used alone, or two or more types may be used in combination.

Commercially available hindered amine light stabilizers may, for example, be "Tinuvin (registered trademark) 111FDL" (molecular weight: 2,000 to 4,000, melting point: 115 to 150° C.), "Tinuvin (registered trademark) 144" (molecular weight: 685, melting point: 146 to 150° C.), "Tinuvin (registered trademark) 152" (molecular weight: 756.6, melting point: 83 to 90° C.), manufactured by BASF Corporation, "Sanduvor (registered trademark) 3051 powder" (molecular weight: 364.0, melting point: 225° C.), "Sanduvor (registered trademark) 3070 powder" (molecular weight: 1,500, melting point: 148° C.), "VP Sanduvor (registered trademark) PR-31" (molecular weight: 529, melting point: 120 to 125° C.), manufactured by Clariant, etc.

<Other Components (H)>

The composition may contain other ingredients (H) depending on the purpose.

Other components (H) may, for example, be a matting agent (ultrafine synthetic silica or the like), a surfactant (nonionic, cationic or anionic), a leveling agent, a surface adjusting agent (to improve the surface smoothness of a coating film), a degassing agent (having a function to discharge air included in the powder, a blocking agent, moisture, etc. coming out from the curing agent (C), out of the coating film, so that they will not remain inside of the coating film, and it is usually solid, but when melted, becomes to have a very low viscosity), a filler, a heat stabilizer, a thickener, a dispersing agent, an antistatic agent, a rust inhibitor, a silane coupling agent, an antifouling agent, a low-staining agent, a non-fluororesin (acrylic resin, epoxy resin, etc.) (excluding the polyester polymer (B)), a pigment other than titanium oxide (E), etc.

The acrylic resin improves the dispersibility of titanium oxide (E).

The acrylic resin is preferably a resin having a reactive group (carboxy group, hydroxy group, etc.) and a glass transition temperature of from 30 to 60° C. When the glass transition temperature is at least the above lower limit value, the cured film tends to be hardly blocked. When the glass transition temperature is at most the above upper limit value, surface smoothness of the cured film will be excellent.

The acrylic resin is preferably a resin having a number average molecular weight of from 5,000 to 50,000. When the number average molecular weight is at least the above lower limit value, the cured film tends to be hardly blocked. When the number average molecular weight is at most the above upper limit value, surface smoothness of the cured film will be excellent.

The acrylic resin is preferably a resin having a carboxy group and an acid value of from 150 to 400 mgKOH/g. When the acid value is at least the above lower limit value, there will be an effect to improve dispersibility of titanium oxide (E). When the acid value is at most the above upper limit value, moisture resistance of the cured film will be excellent.

Other pigment is preferably at least one member selected from the group consisting of a luster pigment, an anticorrosive pigment, a coloring pigment and an extender pigment.

The luster pigment is a pigment for lustering a coating film. The luster pigment may, for example, be aluminum powder, nickel powder, stainless powder, copper powder, bronze powder, gold powder, silver powder, mica powder, graphite powder, glass flakes, scale-like iron oxide powder, etc.

The anticorrosive pigment is a pigment for preventing corrosion or deterioration of a substrate, for a substrate which requires anti-corrosiveness. As the anticorrosive pigment, a lead-free anticorrosive pigment presenting little impact on the environment is preferred. The lead-free anticorrosive pigment may, for example, be zinc cyanamide, zinc oxide, zinc phosphate, calcium magnesium phosphate, zinc molybdate, barium borate, calcium zinc cyanamide, or the like.

The coloring pigment is a pigment for coloring a coating film. The coloring pigment may, for example, be titanium oxide, carbon black, iron oxide, phthalocyanine blue, phthalocyanine green, quinacridone, isoindolinone, benzimidazolone, dioxazine or the like.

The extender pigment is a pigment to improve the hardness of a cured film and to increase the thickness of the cured film. Further, it is preferably incorporated so that when the coated article is cut, the cut surface of the cured film can be made clean. The extender pigment may, for example, be talc, barium sulfate, mica, calcium carbonate or the like.

<Contents of Respective Components in Composition ($\alpha$)>

The content ratio ((A)/(B)) of the fluorinated polymer (A) to the polyester polymer (B) contained in the composition ($\alpha$) is preferably from 90/10 to 10/90 (mass ratio), more preferably from 85/15 to 15/85 (mass ratio), particularly preferably from 80/20 to 20/80 (mass ratio). When the proportion of the fluorinated polymer (A) is at least the above lower limit value, weather resistance of the cured film will be excellent. When the proportion of the polyester polymer (B) is at least the above lower limit value, it is possible to reduce the cost of the cured film.

In a case where the composition ($\alpha$) contains a curing agent (C), the content of the curing agent (C) in the composition ($\alpha$) is preferably from 1 to 50 parts by mass, particularly preferably from 3 to 30 parts by mass, per 100 parts by mass of the total of fluorinated polymer (A) and the polyester polymer (B) in the composition ($\alpha$).

In a case where the curing agent (C) is a blocked isocyanate curing agent, the content of the blocked isocyanate curing agent in the composition ($\alpha$) is such an amount that the molar ratio of isocyanate groups to hydroxy groups in the composition ($\alpha$) would be preferably from 0.05 to 1.5, particularly preferably from 0.8 to 1.2. When the molar ratio is at least the above lower limit value, the curing degree of the coating material tends to be high, and the adhesion between the fluororesin layer and the polyester layer, and the hardness and chemical resistance of the cured film will be excellent. When the molar ratio is at most the above upper limit value, the cured film is unlikely to become brittle, and moreover, the cured film will be excellent in heat resistance, chemical resistance, moisture resistance, etc.

The content of the ultraviolet absorber (D) in the composition (α) is preferably from 0.1 to 20 parts by mass, particularly preferably 0.2 to 15 parts by mass, per 100 parts by mass of the fluorinated polymer (A) in the composition (α). When the content of the ultraviolet absorber (D) is at least the above lower limit value, the effect for protecting the polyester layer can be obtained sufficiently. In particular, the ultraviolet absorber (D) is gradually decomposed by ultraviolet rays, and therefore, the content is preferably at least the above lower limit value from the viewpoint of protecting the polyester layer for a long period of time. When the content of the ultraviolet absorber (D) is at most the above upper limit value, yellowing coloration of the cured film can be prevented.

The content of titanium oxide (E) in the composition (α) is preferably from 20 to 200 parts by mass, particularly preferably from 50 to 150 parts by mass, per 100 parts by mass of the polyester polymer (B) in the composition (α).

In a case where the composition (α) contains a curing catalyst (F), the content of the curing catalyst (F) is preferably from 0.0001 to 10.0 parts by mass per 100 parts by mass of the sum of solid contents in the composition (α) other than titanium oxide (E). When the content of the curing catalyst (F) is at least the above lower limit value, the catalytic effect tends to be obtainable sufficiently. When the content of the curing catalyst (F) is at most the above upper limit value, a gas such as air that has been included in the powder coating material in the melting and curing process of the powder coating material, tends to be easily released, and deterioration in heat resistance, weather resistance and water resistance of the cured film which may be caused by the remaining gas tends to be less.

In a case where the composition (α) contains a light stabilizer (G), the content of the light stabilizer (G) in the composition (α) is preferably from 0.05 to 20 parts by mass, particularly preferably from 0.1 to 15 parts by mass, per 100 parts by mass of the polyester polymer (B) in the composition (α). When the content of the light stabilizer (G) is at least the above lower limit value, the effect for protecting the polyester layer can be obtained sufficiently. When the content of the light stabilizer (G) exceeds the above upper limit value, the effect will be saturated.

In a case where the composition (α) contains other components (H), the total content of other components (H) in the composition (α) is preferably at most 45 mass %, particularly preferably at most 30 mass %, in the composition (α) (100 mass %). In the case of using an acrylic resin as other component (H), the content of the acrylic resin is preferably from 1 to 10 mass % in the composition (α) (100 mass %).

(Process for Producing Powder Coating Material (I))

The powder coating material (I) may, for example, be produced by a production process having the following step (a), step (b) and step (c).

(a) A step of melt-kneading a mixture which comprises the fluorinated polymer (A) and the polyester polymer (B), the ultraviolet absorber (D) and titanium oxide (E) and may contain, as the case requires, the curing agent (C), the curing catalyst (F), the light stabilizer (G), and other components (H), to obtain a kneaded product composed of the composition (α).

(b) A step of pulverizing the kneaded product composed of the composition (α) to obtain a powder (X).

(c) As the case requires, a step of classifying the powder (X).

<Step (a)>

After preparing a mixture by mixing the respective components, the mixture is melt-kneaded to obtain a kneaded product in which the respective components are homogenized.

Each component is preferably preliminarily pulverized into a powder form.

The apparatus to be used for mixing may, for example, be a high speed mixer, a V type mixer, an inversion mixer or the like.

The apparatus to be used for melt-kneading may, for example, be a single-screw extruder, a twin-screw extruder, a planetary gear or the like.

The kneaded product is preferably pelletized after cooling.

<Step (b)>

The apparatus to be used for pulverization may be a pulverizer such as a pin mill, a hammer mill or a jet mill.

<Step (c)>

In order to remove a powder having a too large particle size or a powder having a too small particle size, it is preferred to carry out classification after the pulverization. In the classification, it is preferred to remove at least either one of particles having a particle size of less than 10 μm and particles having a particle size exceeding 100 μm.

The classification method may, for example, be a method by sieving, an air classification method, etc.

The average particle size of the powder (X) is, for example, preferably from 25 to 50 μm by a 50% average volume particle size distribution. The measurement of the particle size of the powder is usually carried out by using a particle size measuring apparatus of a type to capture the potential change during passage through pores, a laser diffraction system, an image judgement system, or a sedimentation rate measurement system.

[Powder Coating Material (II)]

The powder coating material (II) comprises at least one type of powder (Y) made of a composition (β) containing a fluorinated polymer (A), and at least one type of powder (Z) made of a composition (γ) containing a polyester polymer (B) and not containing the fluorinated polymer (A). However, it is necessary that either one or both of the composition (β) and the composition (γ) contain an ultraviolet absorber (D), and either one or both of the composition (β) and the composition (γ) contain titanium oxide (E).

The total content of the powder (Y) and the powder (Z) in the powder coating material (II) is preferably from 50 to 100 mass %, more preferably from 70 to 100 mass %, further preferably from 80 to 100 mass %, particularly preferably from 90 to 100 mass %. The powder coating material (II) may be a coating material composed solely of the powder (Y) and the powder (Z).

The mixing ratio (Powder (Y)/Powder (Z)) of the powder (Y) to the powder (Z) in the powder coating composition (II) is preferably from 90/10 to 10/90 (mass ratio), more preferably from 85/15 to 15/85 (mass ratio), particularly preferably from 80/20 to 20/80 (mass ratio). When the proportion of the powder (Y) is at least the above lower limit value, weather resistance of the cured film will be excellent. When the proportion of the powder (Z) is at least the above lower limit value, it is possible to reduce the cost of the cured film.

The powder (Z) contained in the powder coating material (II) contains the polyester polymer (B) which can be layer-separated without being compatible with the fluorinated polymer (A), whereby when a substrate is coated with the powder coating material (II) by one coating to form a coating film formed from a melt of the powder coating material (II), and reactive components in the coating film are reacted, followed by cooling and curing the coating film, a fluororesin layer composed mainly of a cured product of the fluorinated polymer (A) derived from the powder (Y) and a polyester layer composed mainly of a cured product of the polyester polymer (B) derived from the powder (Z) will be layer-separated. In such a case, the ultraviolet absorber (D) having high affinity to the fluorinated polymer (A) will be eccentrically distributed in the fluororesin layer, and titanium oxide (E) having high affinity to the polyester polymer (B) will be eccentrically distributed in the polyester layer. In the present invention, such a reaction, curing and layer-separation may proceed simultaneously. The polyester layer will be disposed on the substrate side, and the fluororesin layer will be disposed on the air side.

(Composition (β))

The composition (β) comprises a fluorinated polymer (A). As the case requires, it may contain a curing agent (C), an ultraviolet absorber (D), titanium oxide (E), a curing catalyst (F), a light stabilizer (G) and other components (H). However, it is necessary that either one or both of the composition (β) and the composition (γ) contain an ultraviolet absorber (D), and either one or both of the composition (D) and the composition (γ) contain titanium oxide (E). The ultraviolet absorber (D) is preferably contained in the composition (β), since it tends to be readily eccentrically distributed in the fluororesin layer. Titanium oxide (E) is preferably not contained in the composition (β), since it tends to be eccentrically distributed in the polyester layer.

(Composition (γ))

The composition (γ) comprises the polyester polymer (B) and does not contain the fluorinated polymer (A). As the case requires, it may contain a curing agent (C), an ultraviolet absorber (D), titanium oxide (E), a curing catalyst (F), a light stabilizer (G), and other components (H). However, it is necessary that either one or both of the composition (β) and the composition (γ) contain an ultraviolet absorber (D), and either one or both of the composition (β) and the composition (γ) contain titanium oxide (E). The ultraviolet absorber (D) is preferably not contained in the composition (γ), since it tends to be easily eccentrically distributed in the fluororesin layer. Titanium oxide (E) is preferably contained in the composition (γ), since it tends to be readily eccentrically distributed in the polyester layer.

(Contents of Respective Components in the Entire Powder Coating Material (II))

The content ratio ((A)/(B)) of the fluorinated polymer (A) to the polyester polymer (B) contained in the entire powder coating material (II), is preferably from 90/10 to 10/90 (mass ratio), more preferably from 85/15 to 15/85 (mass ratio), particularly preferably from 80/20 to 20/80 (mass ratio). When the proportion of the fluorinated polymer (A) is at least the above lower limit value, weather resistance of the cured film will be excellent. When the proportion of the polyester polymer (B) is at least the above lower limit value, it is possible to reduce the cost of the cured film.

In a case where either one or both of the composition (β) and the composition (γ) contain a curing agent (C), the content of the curing agent (C) in the powder coating material (II) is preferably from 1 to 50 parts by mass, particularly preferably from 3 to 30 parts by mass, per 100 parts by mass of the total of the fluorinated polymer (A) and the polyester polymer (B) in the powder coating material (II).

In a case where the curing agent (C) is a blocked isocyanate curing agent, the content of the blocked isocyanate curing agent in the powder coating material (II) is such an amount that the molar ratio of isocyanate groups to hydroxyl groups in the powder coating material (II) would be preferably from 0.05 to 1.5, particularly preferably from 0.8 to 1.2. When the molar ratio is at least the above lower limit value, the curing degree of the coating material will be high, and the adhesion between the fluororesin layer and the polyester layer, and the hardness and chemical resistance of the cured film, will be excellent. When the molar ratio is at most the above upper limit value, the cured film tends to be unlikely to become brittle, and moreover, the cured film will be excellent in heat resistance, chemical resistance, moisture resistance, etc.

The content of the ultraviolet absorber (D) in the powder coating material (II) is preferably from 0.1 to 20 parts by mass, particularly preferably from 0.2 to 15 parts by mass, per 100 parts by mass of the fluorinated polymer (A) in the powder coating material (II). When the content of the ultraviolet absorber (D) is at least the above lower limit value, the effect for protecting the polyester layer can be obtained sufficiently. In particular, since the ultraviolet absorber (D) tends to be gradually decomposed by e.g. ultraviolet rays, it is preferably at least the above lower limit value from the viewpoint of protection of the polyester layer for a long period of time. When the content of the ultraviolet absorber (D) is at most the above upper limit value, yellowing coloration of the cured film can be prevented.

The content of titanium oxide (E) in the powder coating material (II) is preferably from 20 to 200 parts by mass, particularly preferably from 50 to 150 parts by mass, per 100 parts by mass of the polyester polymer (B) in the powder coating material (II).

In a case where either one or both of the composition (β) and the composition (γ) contain a curing catalyst (F), the content of the curing catalyst (F) in the powder coating material (II) is preferably from 0.0001 to 10.0 parts by mass per 100 parts by mass of the total of solid contents other than titanium oxide (E) in the powder coating material (II). When the content of the curing catalyst (F) is at least the above lower limit value, the catalytic effect tends to be obtainable sufficiently. When the content of the curing catalyst (F) is at most the above upper limit value, a gas such as air that has been included in the powder coating material during the melting and curing process of the powder coating material, tends to be easily released, and deterioration in heat resistance, weather resistance and water resistance of the cured film which may be caused by the remaining gas, tends to be less.

In a case where either one or both of the composition (β) and the composition (γ) contain a light stabilizer (G), the content of the light stabilizer (G) in the powder coating material (II) is preferably from 0.05 to 20 parts by mass, particularly preferably from 0.1 to 15 parts by mass, per 100 parts by mass of the polyester polymer (B) in the powder coating material (II). When the content of the light stabilizer (G) is at least the above lower limit value, the effect for protecting the polyester layer can be obtained sufficiently. When the content of the light stabilizer (G) exceeds the above upper limit value, the effect will be saturated.

In a case where either one or both of the composition (β) and the composition (γ) contain other components (H), the total content of other components (H) in the powder coating material (II) is preferably at most 45 mass %, particularly preferably at most 30 mass %, in the powder coating material (II) (100 mass %). In the case of using an acrylic resin as other component (H), the content of the acrylic resin is preferably from 1 to 10 mass % in the powder coating material (II) (100 mass %).

(Process for Producing Powder Coating Material (II))

The powder coating material (II) may, for example, be produced by a production process comprising the following step (a1), step (b1), step (c1), step (a2), step (b2), step (c2) and step (d).

(a1)) A step of melt-kneading a mixture which contains the fluororesin (A1) and may contain, as the case requires, the ultraviolet absorber (D), titanium oxide (E), the curing agent (C), the curing catalyst (F), the light stabilizer (G) and other components (H), to obtain a kneaded product composed of the composition ($\beta$).

(b1) A step of pulverizing the kneaded product composed of the composition ($\beta$) to obtain a powder (Y).

(c1) As the case requires, a step of classifying the powder (Y).

(a2) A step of melt-kneading a mixture which contains the polyester polymer (B) and no fluorinated polymer (A) and may contain, as the case requires, the ultraviolet absorber (D), titanium oxide (E), the curing agent (C), the curing catalyst (F), the light stabilizer (G) and other components (H), to obtain a kneaded product composed of the composition ($\gamma$).

(b2) A step of pulverizing the kneaded product composed of the composition ($\gamma$) to obtain a powder (Z).

(c2) As the case requires, a step of classifying the powder (Z).

(d) A step of dry-blending the powder (Y) and the powder (Z).

<Steps (a1) and (a2)>

After preparing a mixture by mixing the respective components, the mixture is melt-kneaded to obtain a kneaded product in which the respective components are homogenized.

Each component is preferably preliminarily pulverized into a powder form.

The apparatus to be used for mixing may, for example, be a high speed mixer, a V type mixer, an inversion mixer or the like.

The apparatus to be used for melt-kneading may, for example, be a single-screw extruder, a twin-screw extruder, a planetary gear or the like.

The kneaded product is preferably pelletized after cooling.

<Steps (b1) and (b2)>

The apparatus to be used for pulverization, may be a pulverizer such as a pin mill, a hammer mill or a jet mill.

<Steps (c1) and (c2)>

In order to remove a powder having a too large particle size or a powder having a too small particle size, it is preferred to carry out classification after the pulverization. In the classification, it is preferred to remove at least either one of particles having a particle size of less than 10 µm and particles having a particle size exceeding 100 µm.

The classification method may, for example, be a method by sieving, an air classification method, etc.

The average particle size of the powder (Y) and the powder (Z) is, for example, preferably from 25 to 50 µm by a 50% average volume particle size distribution. The measurement of the particle size of a powder is usually carried out by using a particle size measuring apparatus of e.g. a type to capture the potential change during passage through pores, a laser diffraction system, an image judgement system, a sedimentation rate measurement system or the like.

<Step (d)>

The apparatus to be used for dry blending may, for example, be a high-speed mixer, a double cone mixer, a kneader, a tumbler mixer, a mixing shaker, a drum shaker, a rocking shaker or the like.

The mixing ratio of the powder (Y) to the powder (Z) (Powder (Y)/Powder (Z)) is preferably from 90/10 to 10/90 (mass ratio), more preferably from 85/15 to 15/85 (mass ratio), particularly preferably from 80/20 to 20/80 (mass ratio). When the proportion of the powder (Y) is at least the above lower limit value, the weather resistance of the coating film will be excellent. When the proportion of the powder (Z) is at least the above lower limit value, it is possible to reduce the cost of the coating film.

[Process for Producing Coated Article]

The coated article of the present invention can be produced by a production process having the following step (e) and step (f).

(e) A step of applying the powder coating material on a substrate to form a coating film made of a melt of the powder coating material.

(f) A step of curing the coating film to form a cured film.

<Step (e)>

The powder coating material is applied on a substrate to form a coating film made of a melt of the powder coating material on the substrate. In the coating film, an upper layer composed mainly of a melt of the fluorinated polymer (A) and a lower layer composed mainly of a melt of the polyester polymer (B) are layer-separated, and reactive components in each layer will undergo a curing reaction.

The coating film made of the melt of the powder coating material may be formed at the same time as the application of the powder coating material to the substrate, or may be formed by depositing a powder of the powder coating material on the substrate, followed by heating and melting the powder on the substrate.

The curing reaction of reactive components in the composition is initiated substantially at the same time as the powder coating material is heated and melted, and therefore, it is necessary to carry out the deposition, and the heating and melting, of the powder coating material, substantially at the same time, or to carry out the deposition of the powder coating material on the substrate, followed by heating and melting of the powder coating material.

The heating temperature to heat and melt the powder coating material (hereinafter referred to also as the "baking temperature"), and the heating retention time to maintain the molten state for a predetermined period of time (hereinafter referred to also as the "baking time") are appropriately set depending upon the types and composition of the raw material components of the powder coating material, the desired thickness of the coating film, etc. Particularly, the baking temperature is preferably set depending on the reaction temperature of the curing agent (C). For example, in the case of using, as the curing agent (C), a blocked polyisocyanate curing agent, the baking temperature is preferably from 170 to 210° C. The baking time is preferably from 5 to 120 minutes, particularly preferably from 10 to 60 minutes.

The coating method may, for example, be an electrostatic coating method, an electrostatic spraying method, an electrostatic immersion method, a misting method, a fluidized bed dipping method, a blowing method, a spraying method, a thermal spraying method, a plasma spraying method or the like. An electrostatic coating method using a powder coating gun is preferred, in that the coating film will be excellent in surface smoothness even when it is made thin, and further, from the viewpoint of excellent hiding properties of the coating film.

The powder coating gun may be a corona charging type spray gun or a friction charging type spray gun. The corona charging type coating gun is one to spray the powder coating material by corona discharge treatment. The friction charging type coating gun is one to spray the powder coating material by triboelectric charging treatment.

The ejection amount of the powder coating material from the powder coating gun is preferably from 50 to 200 g/min.

The distance from the tip of the gun portion of the powder coating gun to the substrate, is preferably from 150 to 400 mm from the viewpoint of coating efficiency.

In the case of using the corona charge type coating gun, the load voltage to be applied to components constituting the powder coating material by corona discharge treatment is preferably −50 to −100 kV, and from the viewpoint of coating efficiency (the proportion of the powder coating material deposited on the substrate) and excellent appearance of the coating film, it is preferably from −60 to −80 kV.

In the case of using the friction charging type coating gun, the internally generated current of the powder coating material by triboelectric charging treatment, is preferably from 1 to 8 µA from the viewpoint of coating efficiency and excellent appearance of the coating film.

In the case of industrial implementation of the electrostatic coating method, for example, a non-coated mirror (substrate) is installed, a grounded conductive horizontal belt conveyor for grounding is set in a coating chamber, and a gun is set at an upper portion in the coating chamber. The coating pattern width is preferably from 50 to 500 mm, the operating speed of the gun is preferably from 1 to 30 m/min, the conveyor speed is preferably from 1 to 50 m/min, and suitable conditions may be selected within the above ranges depending upon the purpose.

As the coating method, a fluidized bed dipping method is preferred from such a viewpoint that it is possible to form a relatively thick cured film.

In the fluidized bed dipping method, it is preferred that in a fluidized bed in which a powder coating material flowing as carried by a gas such as air, is accommodated, a substrate having the surface heated to a temperature of at least the melting temperature of the powder coating material, is dipped to let the powder be deposited and at the same time, be melted, on the surface of the substrate, to form a coating film having a predetermined thickness on the substrate, and then, the coated substrate is taken out from the fluidized bed, and, as a case requires, the molten state of the coating film is maintained for a predetermined time, followed by cooling to cool the coating film in the molten state for curing, to obtain a substrate having a cured film formed.

In the fluidized bed dipping method, the temperature in the fluidized bed is preferably from 15 to 55° C., and the temperature of the gas such as air blown into the fluidized bed in order to fluidize the powder is also preferably from 15 to 55° C. The temperature of at least the surface to be coated, of the substrate to be dipped in the fluidize bed, is preferably from 300 to 450° C., and the time for dipping the substrate in the fluidized bed is preferably from 1 to 120 seconds. The substrate taken out from the fluidized bed is preferably maintained at a temperature of from 150 to 250° C. for from 1 to 5 minutes.

<Step (f)>

The coating film in a molten state is cooled to room temperature (20 to 25° C.) and cured to form a cured film.

The cooling after the baking may be either rapid cooling or slow cooling, but slow cooling is preferred in that interfacial peeling due to the difference in cure shrinkage of the fluororesin layer and the polyester layer is less likely to occur.

[Mechanism of Action]

In the coated article of the present invention as described above, the cured film is a cured film having a fluororesin layer and a polyester layer, formed by coating the substrate with a powder coating material comprising a fluorinated polymer (A), a polyester polymer (B), an ultraviolet absorber (D) and titanium oxide (E), by one coating, and therefore, formation of the cured film is not cumbersome.

Further, in the coated article of the invention as described above, the atom number concentration of Ti element present in the region (I) is from 0 to 9%, and the atom number concentration of Ti element present in the region (II) is from 8.5 to of 15%, and the proportion of the ultraviolet absorber (D) contained in the region (I) is from 0.5 to 10 mass %, i.e. titanium oxide (E) is eccentrically distributed in the polyester layer, and the ultraviolet absorber (D) is present sufficiently in the fluororesin layer, whereby the cured film will be excellent in weather resistance for the following reasons (i) and (ii).

(i) Titanium oxide (E) is eccentrically distributed in the polyester layer and is not so much present in the fluororesin layer, whereby at the fluororesin layer to be exposed to moisture, a photocatalytic reaction by titanium oxide (E) can be suppressed, and it is possible to prevent deterioration the fluororesin layer.

(ii) The ultraviolet absorber (D) is sufficiently present in the fluororesin layer, whereby ultraviolet rays can be sufficiently absorbed by the fluororesin layer, and it is possible to suppress the amount of ultraviolet rays reaching the polyester layer. Therefore, it is possible to prevent the photocatalytic reaction by titanium oxide (E) eccentrically distributed in the polyester layer, thereby to prevent deterioration of the polyester layer.

EXAMPLES

Now, the present invention will be described in detail with reference to Examples and Comparative Examples. However, it should be understood that the present invention is by no means limited thereto.

Ex. 1 to 7 are Examples of the present invention, and Ex. 8 to 11 are Comparative Examples.

[Measuring Methods, Evaluation Methods]

(Glass Transition Temperature)

The glass transition temperature is the intermediate point glass transition temperature measured by a differential scanning calorimetry (DSC) method.

(Molecular Weight)

The number average molecular weight and the mass average molecular weight are values obtained as calculated as polystyrene by a gel permeation chromatography (GPC) method.

(Average Particle Size)

The average particle size of a powder is a value obtained from the 50% average volume particle size distribution by measurement by means of a laser diffraction particle size distribution analyzer (manufactured by Sympatec, Helos-Rodos).

(Atom Number Concentration of Ti Element Present in Region (I))

By observing a cross section of the cured film by SEM equipped with EDX, the respective atom number concentrations of C element, O element, F element and Ti element present in a region (I) within 5 µm in depth from the surface of the cured film were analyzed by EDX, and the atom number concentration of Ti element was determined when the total of the respective atom number concentrations of C element, O element, F element and Ti element was set to be 100%.
(Atom Number Concentration of Ti Element Present in Region (II))

By observing a cross section of the cured film by SEM equipped with EDX, the respective atom number concentrations of C element, O element, F element and Ti element present in each of a region (II-1) beyond 10 μm and at most 20 μm in depth, a region (II-2) beyond 20 μm and at most 30 μm in depth, a region (II-3) beyond 30 μm and at most 40 μm in depth, a region (II-4) beyond 40 μm and at most 50 μm in depth, and a region (II-5) beyond 50 μm and at most 60 μm in depth, were analyzed by EDX, depending upon the thickness of the cured film, and with respect to each region, the atom number concentration of Ti element was determined when the total of the respective atom number concentrations of C element, O element, F element and Ti element was set to be 100%, whereupon the atom number concentrations of Ti element in the respective regions were summed up and divided by the number of regions to obtain an average value.

As EDX and SEM, the following apparatus were used, and the observation and analyses were conducted under the following conditions.

SEM: SU6600, manufactured by Hitachi High-Tech Co., Ltd.,
EDX: Emax X-max80, manufactured by Horiba Ltd.,
Acceleration voltage: 10 kV,
Coating: platinum (surface coated at 10 kV for 40 seconds),
SEM observation conditions: reflection electron image (COMPO image),
Observation magnification: 20,000-fold,
EDX mapping measurement time: 10 minutes.
(Proportion of Ultraviolet Absorber (D) Contained in Region (I))

The region (I) up to 5 μm in depth from the surface of the cured film was scraped off with a cutter, and 1.23 mg of the obtained powder was put in 1.23 mL of tetrahydrofuran and thoroughly stirred, to extract the ultraviolet absorber (D). Then, the extract was filtered through a polytetrafluoroethylene filter (pore size: 0.45 μm), and the filtrate was automatically injected to a high-performance liquid chromatography apparatus and subjected to high performance liquid chromatography analysis. The amount of the ultraviolet absorber (D) per unit mass in the powder was obtained from the peak derived from the ultraviolet absorber (D) by using a calibration curve prepared beforehand.

The calibration curve was prepared by carrying out a high performance liquid chromatography analysis under the same conditions by using a standard sample prepared by dissolving the ultraviolet absorber (D) in tetrahydrofuran.

<High-performance Liquid Chromatography Conditions>
Apparatus: alliance2695, manufactured by Waters Corp.,
Column: YMC-Pack Pro C18RS (YMC, 5 μm, 4.6×250 mm),
Mobile phase: 0.1% formic acid/THF (30/70 vol %),
Flow rate: 0.8 mL/min.,
Oven temperature: 40° C.,
Injected amount: 10 μL,
Detector: UV (354 nm)/MS.
(Weather Resistance Part 1)

Using a xenon weather meter (manufactured by Suga Test Instruments Co., Ltd.), the 60-degree specular gloss of the surface of a cured film immediately before the test, and the 60-degree specular gloss of the surface of the cured film after the test for 10,000 hours, were measured by means of a gloss meter (PG-1 M, manufactured by Nippon Denshoku Industries Co., Ltd.). When the gloss value immediately before the test was taken as 100%, the proportion of the gloss value after the test for 200 hours was calculated as a gloss retention (unit: %), whereby the accelerated weathering resistance was judged according to the following standards. Here, in an accelerated weathering test, usually water is sprayed, but instead of spraying water, a 1% hydrogen peroxide aqueous solution was used. The gloss retention was measured and calculated in accordance with JIS K5600-4-7: 1999 (ISO 2813: 1994).

<Test Conditions>
Relative humidity: 70% RH,
Temperature: 50° C.,
Light source: 80 W/m² (300 to 400 nm).
<Judgment Standards>
○ (Good): The gloss retention was at least 50%, and no peeling of the fluororesin layer was observed.
X (No good): The gloss retention was less than 50%, or peeling of the fluororesin layer was observed.
(Weather Resistance Part 2)

A test piece was installed outdoor in Naha-city, Okinawa Prefecture, and the 60-degree specular gloss of the surface of the cured film immediately before the installation and the 60-degree specular gloss of the surface of the coating film after three years, were measured by means of a gloss meter (PG-1 M, manufactured by Nippon Denshoku Industries Co., Ltd.) in accordance with JIS K5600-4-7: 1999 (ISO 2813: 1994). When the gloss value immediately before the installation was taken as 100%, the proportion of the gloss value after three years was calculated as the gloss retention (unit: %), whereby the weather resistance was evaluated in accordance with the following standards.
○ (Good): The gloss retention was at least 50%, and no peeling of the fluororesin layer was observed.
X (No good): The gloss retention was less than 50%, or peeling of the fluororesin layer was observed.
(Yellowing Coloration of Cured Film)

Yellowing coloration of a cured film was evaluated by visual observation in accordance with the following standards with respect to a cured film immediately after coating.
○ (Good): The cured film was not colored yellow.
X (No good): The cured film was colored yellow.
[Composition for Powder Coating Material, and Respective Components Used for Preparation of Powder Coating Material]

Fluorinated polymer (A-1): a hydroxy group-containing fluorinated polymer (Lumiflon (registered trademark) LF710F, manufactured by Asahi Glass Company, hydroxy value: 51.3 mgKOH/g, glass transition temperature: 55° C., number average molecular weight: 10, 000).

Polyester polymer (B-1): a polyester resin (CRYLCOAT (registered trademark) 4890-0, manufactured by Daicel-Allnex Ltd., isophthalic acid/neopentyl glycol=49/51 (molar ratio), mass average molecular weight: 4,400, number average molecular weight: 2,500, hydroxy value: 30 mgKOH/g).

Polyester polymer (B-2): a polyester resin (GV-740, manufactured by Japan U-PICA Co., Ltd., terephthalic acid/neopentyl glycol/ethylene glycol=49/24/27 (molar ratio), mass average molecular weight: 4,000, number average molecular weight: 2,000, hydroxy value: 49.8 mgKOH/g, acid value: 3.4 mgKOH/g).

Polyester polymer (B-3): a polyester resin (CRYLCOAT (registered trademark) 4642-3, manufactured by Daicel- Allnex Ltd., isophthalic acid/neopentyl glycol=51/49 (molar ratio), mass average molecular weight: 4,500, number average molecular weight: 2,600, hydroxy value: 10 mgKOH/g, acid value: 36 mgKOH/g).

Curing agent (C-1): a blocked isocyanate curing agent (Vestagon (registered trademark) BF1540, manufactured by Evonik Industries).

Ultraviolet absorber (D-1): an organic ultraviolet absorber (Tinuvin (registered trademark) 460, manufactured by BASF Corp., molecular weight: 629.8, melting point: 93 to 102° C., volatilization temperature: 386.5° C.).

Ultraviolet absorber (D-2): an organic ultraviolet absorber (Tinuvin (registered trademark) 928, manufactured by BASF Corp., molecular weight: 441.6, melting point: 109 to 113° C., volatilization temperature: 296.9° C.).

Titanium oxide (E-1): titanium oxide (Ti-Pure (registered trademark) R960, manufactured by DuPont, titanium oxide content: 89 mass %).

Titanium oxide (E-2): titanium oxide (Tipaque (registered trademark) PFC105, manufactured by Ishihara Sangyo Kaisha Ltd., titanium oxide content: 87 mass %).

Curing catalyst (F-1): a xylene solution of dibutyltin dilaurate (10,000-fold diluted product).

Light stabilizer (G-1): a hindered amine light stabilizer (Tinuvin (registered trademark) 111 FDL, manufactured by BASF Corp., molecular weight: 2,000 to 4,000, melting point: 115 to 150° C., volatilization temperature: 329.0° C.).

Degassing agent (H-1): benzoin.

Surface conditioning agent (H-2): a leveling agent for powder coating material (BYK (registered trademark)-360P, manufactured by BYK-Chemie Inc.).

[Ex. 1 to 11]

The respective components listed in Table 1 or Table 2 were mixed for about 10 to 30 minutes by means of a high speed mixer (manufactured by Yusaki Co., Ltd.) to obtain a powdery mixture. The mixture was melt-kneaded by means of a biaxial extruder (16 mm extruder, manufactured by Thermo Prism Ltd.) at a barrel temperature setting of 120° C., to obtain pellets composed of a composition (α). Then, the obtained pellets were pulverized by means of a pulverizer (rotor speed mill P14, manufactured by FRITSCH) at room temperature, followed by classification by a 150 mesh sieve, to obtain each of the powders (1) to (11), having an average particle size of about 40 μm.

Using the obtained powder as a powder coating material, on one surface of an aluminum plate subjected to chromate treatment, electrostatic coating was applied by an electrostatic coating machine (GX3600C, manufactured by Onoda Cement Corporation) and maintained in an atmosphere of 200° C. for 20 minutes. The coated object was left to cool to room temperature to obtain an aluminum plate having a cured film having a thickness of from 55 to 65 μm. The obtained cured film-attached aluminum plate was used as a test piece and evaluated. The results are shown in Table 1 and Table 2.

TABLE 1

|  |  |  | Ex. | | | | | |
| --- | --- | --- | --- | --- | --- | --- | --- | --- |
|  |  |  | 1 | 2 | 3 | 4 | 5 | 6 |
| Amount [g] | Fluorinated polymer (A-1) |  | 17.0 | 17.0 | 17.0 | 17.0 | 38.0 | 38.0 |
|  | Polyester polymer (B) | (B-1) | 39.0 | 39.0 | 39.0 | — | 16.0 | 16.0 |
|  |  | (B-2) | — | — | — | 39.0 | — | — |
|  |  | (B-3) | — | — | — | — | — | — |
|  | Curing agent (C-1) |  | 10.0 | 10.0 | 10.0 | 10.0 | 11.0 | 11.0 |
|  | Ultraviolet absorber (D) | (D-1) | 4.0 | — | 4.0 | 4.0 | 2.0 | 6.0 |
|  |  | (D-2) | — | 4.0 | 4.0 | 4.0 | 2.0 | 6.0 |
|  | Titanium oxide (E) | (E-1) | 35.0 | 35.0 | 35.0 | — | 35.0 | 35.0 |
|  |  | (E-2) | — | — | — | 35.0 | — | — |
|  | Curing catalyst (F-1) |  | 0.0021 | 0.0021 | 0.0021 | 0.0021 | 0.0021 | 0.0021 |
|  | Light stabilizer (G-1) |  | — | — | — | — | — | — |
|  | Other components (H) | (H-1) | 0.4 | 0.4 | 0.4 | 0.4 | 0.4 | 0.4 |
|  |  | (H-2) | 1.0 | 1.0 | 1.0 | 1.0 | 1.0 | 1.0 |
| Type of powder |  |  | (1) | (2) | (3) | (4) | (5) | (6) |
| Atom number concentration (%) in region (I) | C element |  | 70.7 | 70.8 | 70.6 | 64.2 | 71.2 | 71.0 |
|  | O element |  | 21.2 | 21.1 | 21.2 | 25.8 | 20.7 | 20.9 |
|  | F element |  | 3.4 | 3.6 | 3.4 | 3.1 | 4.4 | 4.1 |
|  | Ti element |  | 4.7 | 4.5 | 4.6 | 7.2 | 3.7 | 4.0 |
| Atom number concentration (%) in region (II) | C element |  | 63.3 | 63.2 | 63.4 | 59.4 | 63.5 | 63.5 |
|  | O element |  | 24.5 | 24.6 | 24.4 | 28.5 | 24.7 | 24.6 |
|  | F element |  | 3.5 | 3.4 | 3.5 | 2.6 | 3.1 | 3.2 |
|  | Ti element |  | 8.7 | 8.8 | 8.7 | 9.5 | 8.7 | 8.7 |
| Region (I): ultraviolet absorber (D) (mass %) |  |  | 2.9 | 2.8 | 5.0 | 5.1 | 2.8 | 6.1 |
| Region (I): ultraviolet absorber (D-1) (mass %) |  |  | 2.9 | — | 2.7 | 2.5 | 1.5 | 3.2 |
| Region (I): ultraviolet absorber (D-2) (mass %) |  |  | — | 2.8 | 2.3 | 2.6 | 1.3 | 2.9 |
| Thickness of cured film [μm] |  |  | 59 | 61 | 60 | 61 | 58 | 62 |
| Evaluation of cured film | Weather resistance | Part 1 | ◯ | ◯ | ◯ | ◯ | ◯ | ◯ |
|  |  | Part 2 | ◯ | ◯ | ◯ | ◯ | ◯ | ◯ |
|  | Yellowing coloration |  | ◯ | ◯ | ◯ | ◯ | ◯ | ◯ |

TABLE 2

| | | | Ex. | | | | |
|---|---|---|---|---|---|---|---|
| | | | 7 | 8 | 9 | 10 | 11 |
| Amount [g] | Fluorinated polymer (A-1) | | 17.0 | 17.0 | 38.0 | 6.0 | 42.0 |
| | Polyester polymer (B) | (B-1) | — | 39.0 | 16.0 | 51.0 | — |
| | | (B-2) | 39.0 | — | — | — | — |
| | | (B-3) | — | — | — | — | 10.0 |
| | Curing agent (C-1) | | 10.0 | 10.0 | 11.0 | 9.0 | 12.0 |
| | Ultraviolet absorber (D) | (D-1) | 4.0 | 1.0 | 8.0 | 8.0 | 8.0 |
| | | (D-2) | 4.0 | — | 8.0 | — | — |
| | Titanium oxide (E) | (E-1) | — | 35.0 | 35.0 | 35.0 | 35.0 |
| | | (E-2) | 35.0 | — | — | — | — |
| | Curing catalyst (F-1) | | 0.0021 | 0.0021 | 0.0021 | 0.0021 | 0.0021 |
| | Light stabilizer (G-1) | | 4.0 | — | — | — | — |
| | Other components (H) | (H-1) | 0.4 | 0.4 | 0.4 | 0.4 | 0.4 |
| | | (H-2) | 1.0 | 1.0 | 1.0 | 1.0 | 1.0 |
| | Type of powder | | (7) | (8) | (9) | (10) | (11) |
| Atom number concentration (%) in region (I) | C element | | 64.1 | 70.7 | 71.0 | 63.4 | 62.9 |
| | O element | | 25.7 | 21.2 | 20.5 | 25.1 | 22.9 |
| | F element | | 3.2 | 3.4 | 4.1 | 1.5 | 4.1 |
| | Ti element | | 7.1 | 4.7 | 4.4 | 10.0 | 10.1 |
| Atom number concentration (%) in region (II) | C element | | 59.6 | 63.3 | 63.0 | 63.7 | 62.8 |
| | O element | | 28.5 | 24.5 | 25.1 | 25.8 | 23.3 |
| | F element | | 2.6 | 3.5 | 3.2 | 1.2 | 4.0 |
| | Ti element | | 9.3 | 8.7 | 8.7 | 10.3 | 9.9 |
| Region (I): ultraviolet absorber (D) (mass %) | | | 5.1 | 0.3 | 11.5 | 5.3 | 5.1 |
| Region (I): ultraviolet absorber (D-1) (mass %) | | | 2.6 | 0.3 | 5.6 | 5.3 | 5.1 |
| Region (I): ultraviolet absorber (D-2) (mass %) | | | 2.5 | — | 5.9 | — | — |
| Thickness of cured film [μm] | | | 58 | 62 | 59 | 60 | 62 |
| Evaluation of cured film | Weather resistance | Part 1 | ○ | X | ○ | X | X |
| | | Part 2 | ○ | X | ○ | X | X |
| | Yellowing coloration | | ○ | ○ | X | ○ | ○ |

The cured films in Ex. 1 to 7 which satisfied the conditions of the present invention, were excellent in weather resistance.

In contrast, the cured film in Ex. 8 wherein the amount of the ultraviolet absorber (D) in the region (I) was too small, was inferior in weather resistance.

Further, the cured film in Ex. 9 wherein the amount of the ultraviolet absorber (D) in the region (I) was too much, was colored yellow.

Further, the cured films in Ex. 10 and 11 wherein the atom number concentration of Ti element in the region (I) was too much, were inferior in weather resistance.

INDUSTRIAL APPLICABILITY

The coated article of the present invention is useful as e.g. a traffic signal, a telephone pole, a road sign pole, a bridge, a railing, a building material (gate, fence, siding material for a house, curtain wall, roof, etc.), a car body or parts (bumper, wiper blade, etc.), a household appliance (outdoor unit of air conditioner, exterior of water heater, etc.), a blade for wind power generation, a solar cell back sheet, a back surface of a heat collection mirror for solar power generation, an eggplant battery exterior, etc.

This application is a continuation of PCT Application No. PCT/JP2014/084329, filed on Dec. 25, 2014, which is based upon and claims the benefit of priority from Japanese Patent Application No. 2013-272662 filed on Dec. 27, 2013. The contents of those applications are incorporated herein by reference in their entireties.

What is claimed is:

1. A coated article comprising:
a substrate: and
a cured film of a powder coating material formed on the substrate, the powder coating material comprising a fluorinated polymer (A), a polyester polymer (B), an ultraviolet absorber (D) and titanium oxide (E), wherein
the thickness of the cured film is from 20 to 1,000 μm,
the atom number concentration of Ti element in region (I) within 5 μm in depth from a surface of the cured film is from 0 to 7.5% as obtained by method (1), with respect to 100% of the total of the atom number concentrations of C element, O element, F element and Ti element present in region (I),
the atom number concentration of Ti element in region (II) beyond 10 μm in depth from the surface of the cured film is from 8.5 to 15% as obtained by method (2), with respect to 100% of the total of the atom number concentrations of C element, O element, F element and Ti element present in region (II), and
the proportion of the ultraviolet absorber (D) contained in region (I) (100 mass %) as obtained by method (3) is from 0.5 to 10 mass %:
method (1):
by observing a cross section of the cured film by a scanning electron microscope equipped with an energy dispersive X-ray analyzer, the respective atom number concentrations of C element, O element, F element and Ti element present in region (I) are analyzed by the energy dispersive X-ray analyzer, to determine the atom number concentration of Ti element, when the total of the respective atom number concentrations of C element, O element, F element and Ti element is set to be 100%, method (2):

by observing a cross section of the cured film by a scanning electron microscope equipped with an energy dispersive X-ray analyzer, with respect to region (II-1) in a case where the thickness of the cured film is at least 20 μm and less than 30 μm, regions (II-1) to (II-2) in a case where the thickness of the cured film is at least 30 μm and less than 40 μm, regions (II-1) to (II-3) in a case where the thickness of the cured film is at least 40 μm and less than 50 μm, regions (II-1) to (II-4) in a case where the thickness of the cured film is at least 50 μm and less than 60 μm, regions (II-1) to (II-5) in a case where the thickness of the cured film is at least 60 μm, the respective atom number concentrations of C element, O element, F element and Ti element present in the respective regions are analyzed by the energy dispersive X-ray analyzer, to determine the atom number concentration of Ti element, when the total of the respective atom number concentrations of C element, O element, F element and Ti element is set to be 100%, in each region, whereupon the atom number concentrations of Ti element in the respective regions are summed up and divided by the number of regions to obtain an average value, region (II-1): a region beyond 10 μm and at most 20 μm in depth from the surface of the cured film, region (II-2 ): a region beyond 20 μm and at most 30 μm in depth from the surface of the cured film, region (II-3): a region beyond 30 μm and at most 40 μm in depth from the surface of the cured film, region (II-4): a region beyond 40 μm and at most 50 μm in depth from the surface of the cured film, region (II-5): a region beyond 50 μm and at most 60 μm in depth from the surface of the cured film, method (3):

a powder obtained by scraping off region (I) with a cutter is subjected to high performance liquid chromatography analysis, whereby the amount of the ultraviolet absorber (D) per unit mass in the powder is obtained from a peak derived from the ultraviolet absorber (D) by using a calibration curve prepared beforehand.

2. The coated article according to claim 1, wherein the coating is one-coating.

3. The coated article according to claim 1, wherein the thickness of the cured film is from 20 to 300 μm.

4. The coated article according to claim 1, wherein the powder coating material further comprises a curing agent (C).

5. The coated article according to claim 1, wherein the fluorinated polymer (A) is at least one member selected from the group consisting of a hydroxy group-containing fluorinated polymer (A1), a carboxy group-containing fluorinated polymer (A2) and a polyvinylidene fluoride.

6. The coated article according to claim 1, wherein the polyester polymer (B) is a polyester polymer having units derived from a $C_{8-15}$ aromatic polycarboxylic acid compound and units derived from a $C_{2-10}$ polyhydric alcohol compound.

7. The coated article according to claim 1, wherein the ultraviolet absorber (D) is an organic ultraviolet absorber.

8. The coated article according to claim 1, wherein the content ratio ((A)/(B)) of the fluorinated polymer (A) to the polyester polymer (B) in the powder coating material is from 90/10 to 10/90 by mass ratio.

9. The coated article according to claim 1, wherein the content of the ultraviolet absorber (D) in the powder coating material, is from 0.1 to 20 parts by mass, with respect to 100 parts by mass of the fluorinated polymer (A).

10. The coated article according to claim 1, wherein the content of titanium oxide (E) in the powder coating material, is from 20 to 200 parts by mass, with respect to 100 parts by mass of the polyester polymer (B).

11. The coated article according to claim 1, wherein the powder coating material is a powder coating material (I) comprising a powder (X) made of a composition (α) comprising the fluorinated polymer (A), the polyester polymer (B), the ultraviolet absorber (D) and titanium oxide (E).

12. The coated article according to claim 11, wherein the composition (α) comprises a curing agent (C).

13. The coated article according to claim 1, wherein the powder coating material is a powder coating material (II) which comprises a powder (Y) made of a composition (β) comprising the fluorinated polymer (A), and a powder (Z) made of a composition (γ) comprising the polyester polymer (B) and not comprising the fluorinated polymer (A), wherein either one or both of the composition (β) and the composition (γ) comprise the ultraviolet absorber (D), and either one or both of the composition (β) and the composition (γ) comprise titanium oxide (E).

14. The coated article according to claim 13, wherein either one or both of the composition (β) and the composition (γ) comprise contain a curing agent (C).

15. The coated article according to claim 1, wherein the ratio ((A)/(B)) of the cured product of the fluorinated polymer (A) as calculated as the fluorinated polymer (A) to the cured product of the polyester polymer (B) as calculated as the polyester polymer (B), contained in the entire cured film, is from 90/10 to 10/90 by mass ratio.

16. The coated article according to claim 1, wherein titanium oxide (E) is surface-treated with at least one selected from silica, alumina, zirconia, selenium, and an organic component.

17. The coated article according to claim 1, wherein the content of titanium oxide (E) in the powder coating material, is from 50 to 200 parts by mass, to 100 parts by mass of the polyester polymer (B).

* * * * *